US011524709B2

(12) United States Patent
Soule et al.

(10) Patent No.: US 11,524,709 B2
(45) Date of Patent: Dec. 13, 2022

(54) ELECTRIC RAIL VEHICLE

(71) Applicant: Parallel Systems, Inc., Culver City, CA (US)

(72) Inventors: Matthew Soule, Culver City, CA (US); John Howard, Culver City, CA (US); Benjamin Stuart Stabler, Culver City, CA (US)

(73) Assignee: Parallel Systems, Inc., Los Angeles, CA (US)

( * ) Notice: Subject to any disclaimer, the term of this patent is extended or adjusted under 35 U.S.C. 154(b) by 0 days.

(21) Appl. No.: 17/694,499

(22) Filed: Mar. 14, 2022

(65) Prior Publication Data

US 2022/0289255 A1    Sep. 15, 2022

Related U.S. Application Data

(60) Provisional application No. 63/299,798, filed on Jan. 14, 2022, provisional application No. 63/278,832, (Continued)

(51) Int. Cl.
*B61F 5/38*    (2006.01)
*B61C 3/02*    (2006.01)
(Continued)

(52) U.S. Cl.
CPC ............ *B61F 5/383* (2013.01); *B61C 3/02* (2013.01); *B61F 3/04* (2013.01); *B61F 5/301* (2013.01); *B61L 27/16* (2022.01)

(58) Field of Classification Search
CPC .. B61F 5/383; B61F 5/301; B61F 3/04; B61C 3/02; B61L 27/16
See application file for complete search history.

(56) References Cited

U.S. PATENT DOCUMENTS 4,245,561 A     1/1981  Krug
2004/0089188 A1  5/2004  Lechner et al.
(Continued)

FOREIGN PATENT DOCUMENTS

DE      19518289 A1 * 11/1996  ............. B61C 17/04
KR    20160126137 A  *  2/2016  ................ B61F 5/38
(Continued)

OTHER PUBLICATIONS

"Bogie designs, Extract from the Railway technical handbook, vol. 1, chapter 2, p. 24 to 41,", https://www.skf.com/binaries/pub12/Images/0901d1968019f48b-RTB-1-02-Bogie-designs_tcm_12-62732.pdf, PUB 42/P2 12782 EN—2012.
(Continued)

*Primary Examiner* — Robert J McGarry, Jr.
(74) *Attorney, Agent, or Firm* — Jeffrey Schox; Diana Lin

(57) ABSTRACT

The electric vehicle can include: a payload interface, a payload suspension, a chassis, a set of bumpers, a sensor suite, a controller, a chassis suspension, and an electric powertrain. The electric vehicle 100 can optionally include a payload adapter, a power source, a cooling subsystem, and/or any other suitable components. The electric vehicle functions to structurally support a payload, such as a cargo container (e.g., intermodal container, ISO container, etc.), and/or to facilitate transportation of a payload via railway infrastructure.

21 Claims, 20 Drawing Sheets

Related U.S. Application Data filed on Nov. 12, 2021, provisional application No. 63/195,620, filed on Jun. 1, 2021, provisional application No. 63/160,538, filed on Mar. 12, 2021.

(51) Int. Cl.
    *B61F 5/30*     (2006.01)
    *B61F 3/04*     (2006.01)
    *B61L 27/16*    (2022.01)

(56) References Cited

U.S. PATENT DOCUMENTS

| | | |
|---|---|---|
| 2007/0107620 A1 | 5/2007  | Wagner |
| 2012/0265378 A1 | 10/2012 | Peitzke et al. |
| 2013/0019774 A1 | 1/2013  | Ahuja et al. |
| 2013/0333590 A1 | 12/2013 | Rodet |
| 2015/0225003 A1 | 8/2015  | Morton |
| 2016/0167681 A1 | 6/2016  | Rodet |
| 2016/0207543 A1 | 7/2016  | Ooe |
| 2017/0291618 A1 | 10/2017 | Karner et al. |
| 2018/0074501 A1 | 3/2018  | Boniske et al. |
| 2019/0168784 A1 | 6/2019  | Wyatt et al. |
| 2021/0070335 A1 | 3/2021  | Bjurström |

FOREIGN PATENT DOCUMENTS

| | | | |
|---|---|---|---|
| RU |   2294293 C1       | 2/2007 | |
| WO | WO-2019165147 A1 * | 8/2019 | ............ B25J 9/163 |
| WO |   2020053608 A1    | 3/2020 | |
| WO |   2021043432 A1    | 3/2021 | |
| WO |   2022006620 A1    | 1/2022 | |

OTHER PUBLICATIONS

Wu, Xingwen, et al., "Analysis of steering performance of differential coupling wheelset", Journal of Modern Transportation, vol. 22, pp. 65-75 (2014).

* cited by examiner

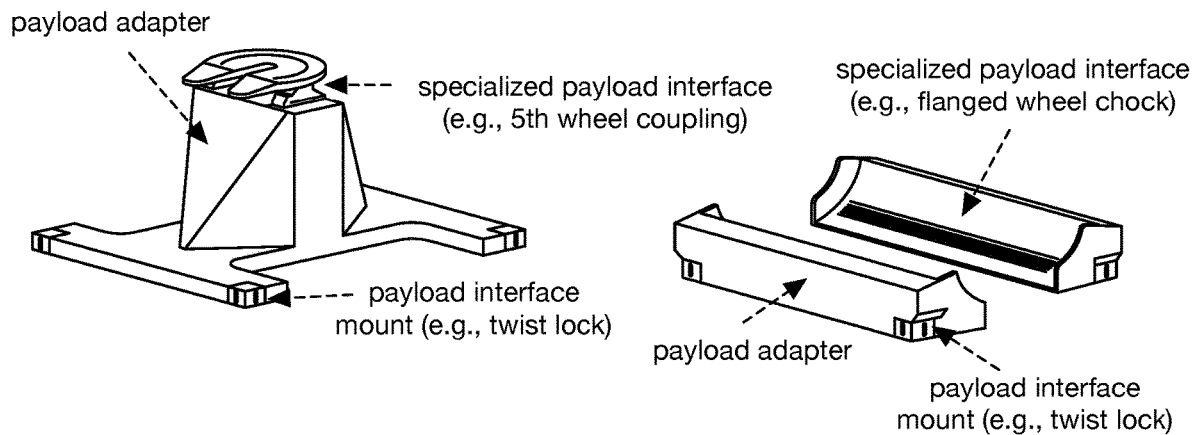
FIGURE 28A
FIGURE 28B
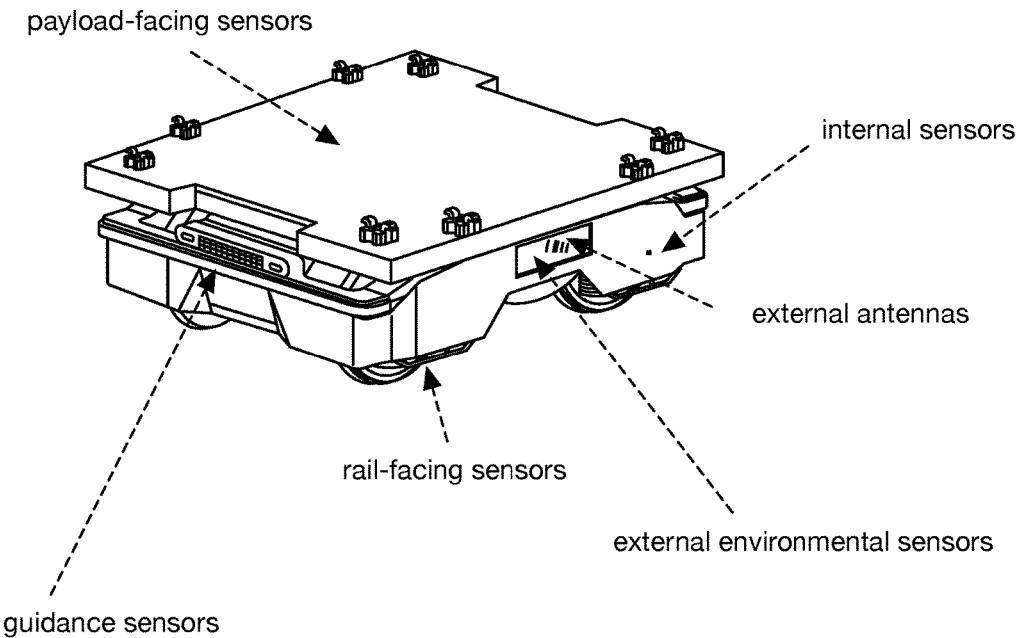
FIGURE 28C

ELECTRIC RAIL VEHICLE

CROSS REFERENCE TO RELATED APPLICATIONS

This application claims the benefit of U.S. Provisional Application No. 63/160,538, filed 12 Mar. 2021, U.S. Provisional Application No. 63/195,620, filed 1 Jun. 2021, U.S. Provisional Application No. 63/278,832, filed 12 Nov. 2021, and U.S. Provisional Application No. 63/299,798, filed 14 Jan. 2022, each of which is incorporated herein in its entirety by this reference.

This application is related to U.S. application Ser. No. 17/335,732, filed of 1 Jun. 2021, which claims the benefit of U.S. Provisional Application No. 63/032,196, filed 29 May 2020, each of which is incorporated herein in its entirety by this reference.

TECHNICAL FIELD

This invention relates generally to the rail transportation field, and more specifically to a new and useful electric vehicle system and/or method in the rail transportation field.

BRIEF DESCRIPTION OF THE FIGURES

FIG. 28A-C are 3D views of a first example of a payload adapter, a second example of a payload adapter, and an example of the electric vehicle system, respectively.

DESCRIPTION OF THE PREFERRED EMBODIMENTS

Figure 1:
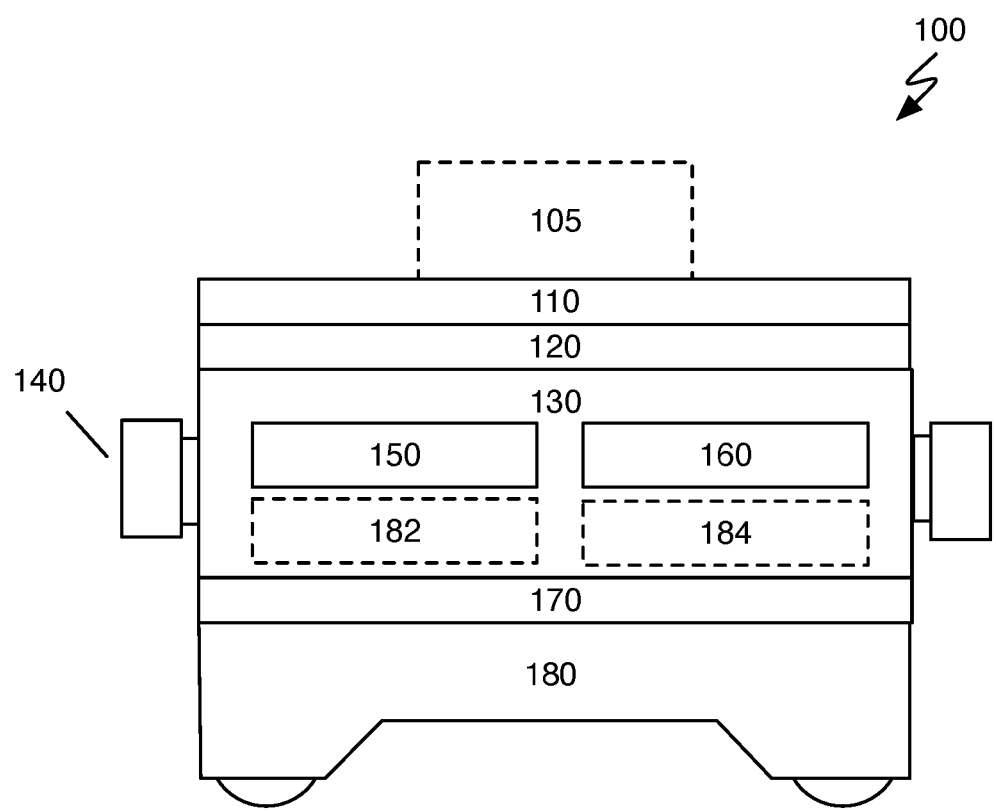
FIG. 1 is a schematic representation of a variant of the electric vehicle system.

The following description of the preferred embodiments of the invention is not intended to limit the invention to these preferred embodiments, but rather to enable any person skilled in the art to make and use this invention.

1. Overview

The electric vehicle 100 can include: a payload interface 110, a payload suspension 120, a chassis 130, a set of bumpers 140, a sensor suite 150, a controller 160, a chassis suspension 170, and an electric powertrain 180. The electric vehicle 100 can optionally include payload adapter 105, a battery 182, a cooling subsystem 184, and/or any other suitable components. However, the system 100 can additionally or alternatively include any other suitable set of components. The controller can include a battery management system (BMS), motor controller (or motor inverter), and/or any other suitable components. The electric powertrain can include: an electric motor and a set of axle assemblies (e.g., wheelsets). The electric powertrain can optionally include a differential (e.g., a lockable differential, unlockable differential) and can include or be used with a set of mechanical brakes. However, the electric powertrain can include any suitable set of components. The electric vehicle functions to structurally support a payload—such as a cargo container (e.g., intermodal container, ISO container, etc.)—and/or to facilitate transportation of a payload via railway infrastructure.

Figure 10:
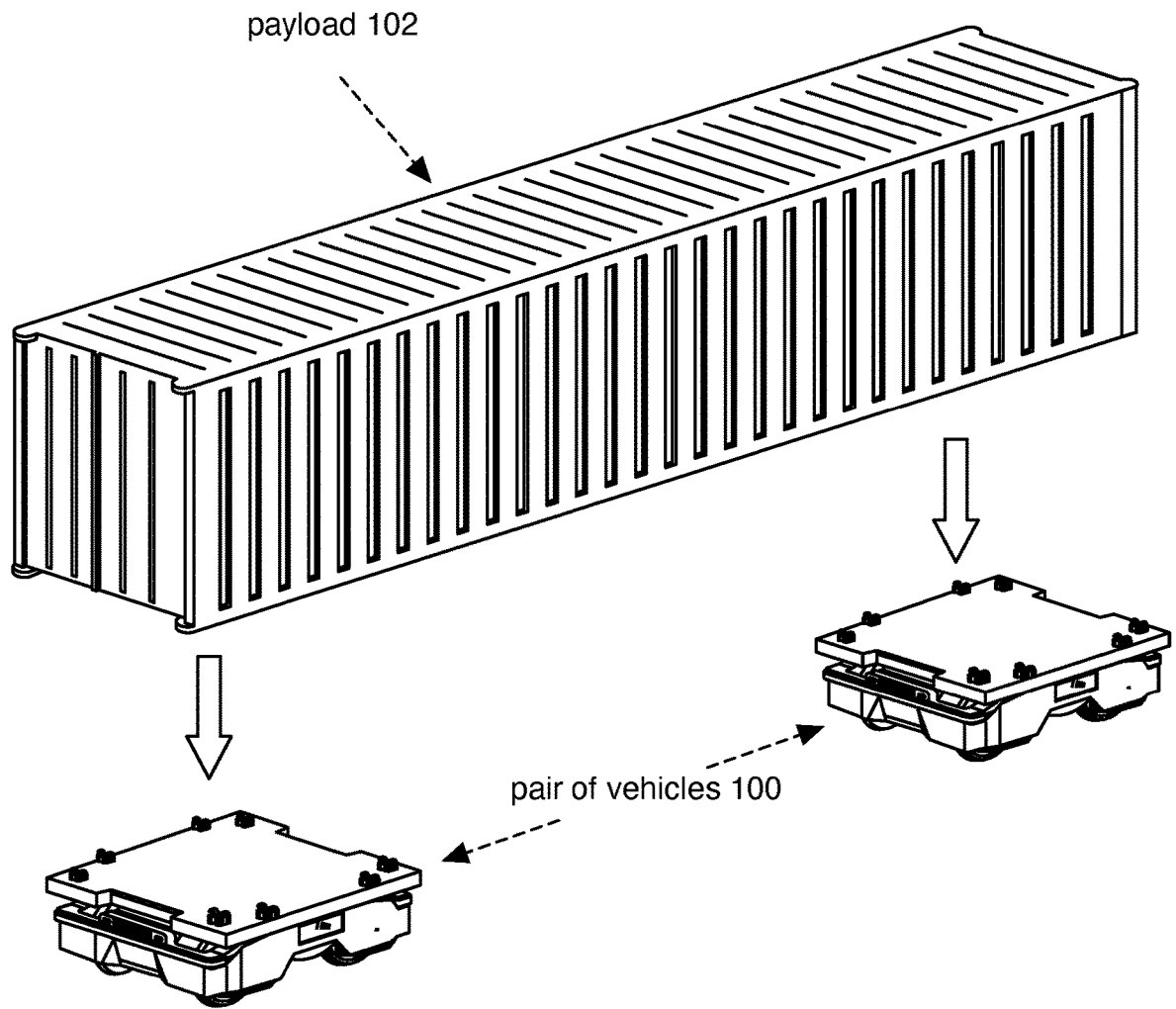
FIG. 10 is an exploded isometric view of an example configuration of a variant of the electric vehicle system.
Figure 26:
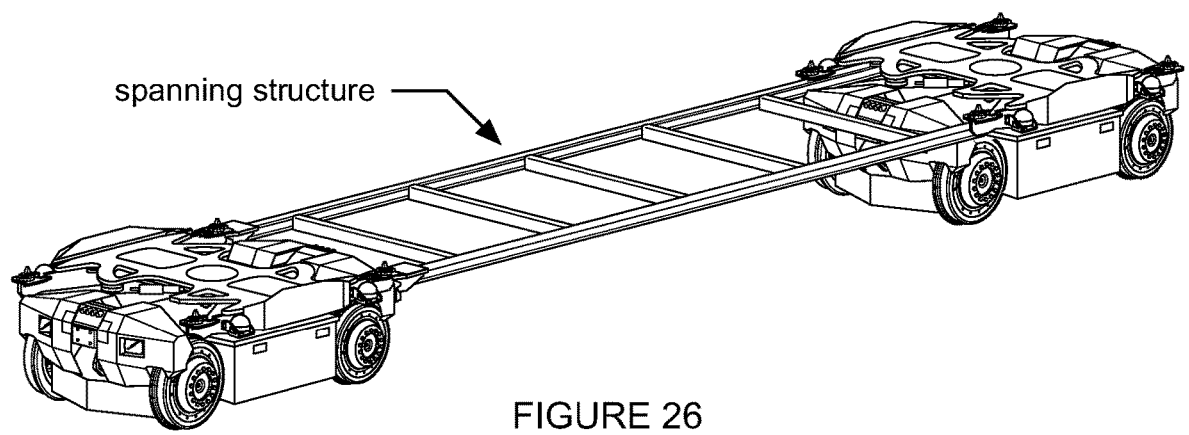
FIG. 26 is an isometric view of a variant of the electric vehicle system which includes a spanning structure

The electric vehicle is preferably an electric rail bogie and/or a rail 'module' configured to operate in a pairwise manner (e.g., examples are shown in FIG. 10, FIG. 11, FIG. 17, FIG. 25, and FIG. 26), such as with a pair of bogies each supporting opposite ends of a payload (an example is shown in FIG. 10; both powered electric rail bogies; one powered electric rail bogie and one unpowered/passive bogies; etc.). In variants, the rail bogie can be configured to support and/or transport a payload without a mechanical interconnect and/ or rigid structure spanning the length of the payload (a.k.a.

a spanning structure). Additionally or alternatively, electric rail bogie can be configured to support multiple payloads (e.g., stacked intermodal containers), include a passive trailer, and/or can be a Jacobs bogie (e.g., configured to support adjacent ends of two payloads). Alternatively, in some variants the electric vehicle can optionally include or be used in conjunction with a spanning structure which rigidly couples a pair of bogies (e.g., mounting to the payload interface) and/or sets a fixed spacing between the bogies (e.g., based on a payload length, such that an intermodal cargo container can be fastened to the payload interface, etc.). In such variants, the spanning structure can be used to mount and/or structurally support a cargo container (e.g., without transferring forces and/or roll moments through the cargo container; an example is shown in FIG. 26). Additionally or alternatively, the spanning structure can support expanded battery storage capacity, such as may be used to increase the electric range of the individual vehicles (e.g., a bogie at one end) and/or a pair of bogies.

Accordingly, the electric vehicle(s) can be cooperatively controllable in a pairwise and/or multiplicative manner, but can additionally or alternatively be individually maneuverable on a rail infrastructure. However, the electric vehicle can be otherwise suitably operated and/or controlled. The electric vehicle is preferably symmetric (e.g., has mirror symmetry across a lateral plane), and is bidirectionally operable, but can alternatively be unidirectionally operable or otherwise configured.

Figure 25:
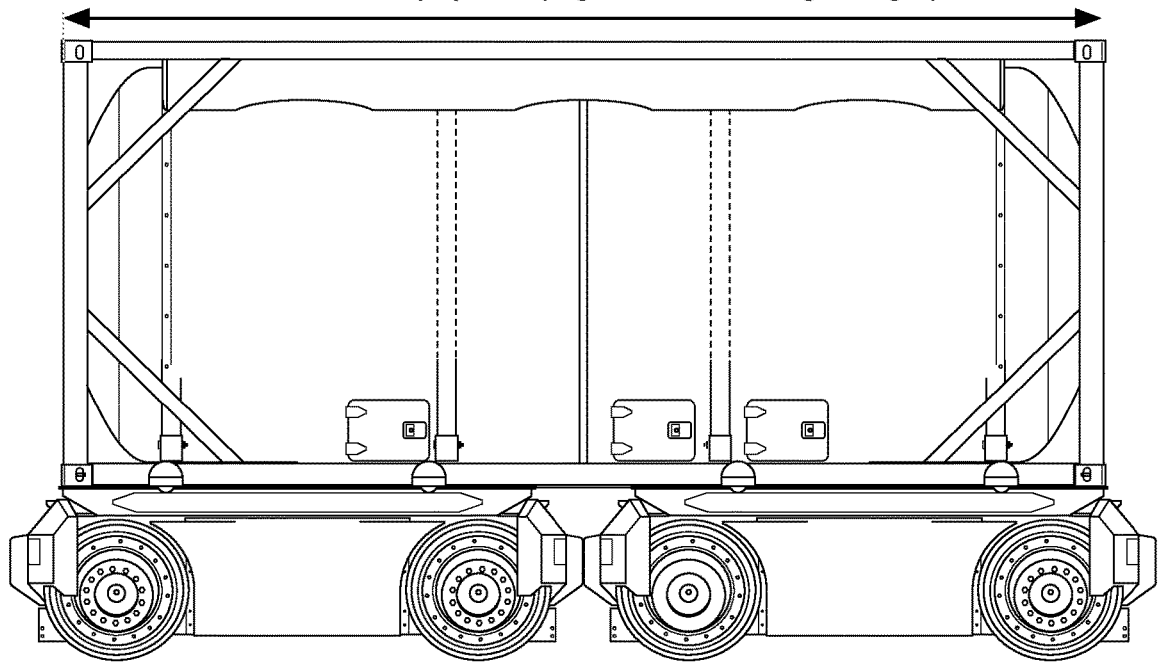
FIG. 25 is a side view illustration of a variant of the electric vehicle system.

In variants, a longitudinal length of the vehicle is approximately a half-length or less of a predetermined container size (e.g., an example is shown in FIG. 25; within 4 feet, within 2 feet, within 1 foot, etc.). For instance, where a minimum cargo container length is 20 feet, the (longitudinal) vehicle length is preferably about 10 feet (plus half of an air-gap offset; 12 feet for example; such that two bogies end-to-end collectively exceed a minimum payload length to facilitate bumper abutment rather than payload abutment between adjacent pairs of vehicles). In variants, the (longitudinal) vehicle length can be: less than 6 feet, 6 feet, 8 feet, 10 feet, 12 feet, 15 feet, 20 feet, 22 feet, 24 feet, 40 feet, 42 feet, greater than 24 feet, any open or closed range bounded by the aforementioned values, and/or any other suitable length. Alternatively, the longitudinal length of the vehicle can be larger than a payload length and/or of any other suitable dimension.

In a specific example, the electric rail vehicles can be controlled or operated individually and/or collectively within a rail network (e.g., in a platoon) as described in U.S. application Ser. No. 17/335,732, filed 1 Jun. 2021, which is incorporated herein in its entirety by this reference.

The term "traction motor" as referenced herein can refer to an electric motor used for propulsion of a vehicle (i.e., the electric vehicle 100), and can thus be understood to be interchangeable with the term "motor" and/or "electric motor" in the context of vehicle propulsion and/or powertrain systems. However, the terms "traction motor" and/or "electric motor" can be otherwise suitably utilized and/or referenced.

The term "wheelset" as referenced herein preferably refers to a pair of rail wheels rigidly on an axle (such as a split axle, solid axle, floating axle, driven axle, driving axle, etc.) such that both wheels rotate substantially in unison. In an example, a wheelset can include a solid axle rigidly connecting a pair of wheels. In a second example, a wheelset can include a split axle, with a wheel independently suspended at either end (e.g., resembling an automotive suspension, with a differential, etc.). However, the term wheelset may be otherwise suitably referenced herein.

1.1 Variants

In a first set of variants, an electric rail vehicle can include: a chassis defining a longitudinal axis (e.g., a length) and a lateral axis perpendicular to the longitudinal axis (e.g., a width), the chassis having a stiffness mismatch between the lateral and longitudinal axes; a set of bumpers mounted to the chassis, the set of bumpers comprising an abutment surface at a maximal extent of the electric rail vehicle along the longitudinal axis; a payload interface configured to removably mount a cargo payload to the electric rail vehicle; a bolster bowl rotatably mounting the payload interface to the chassis; a plurality of suspension elements coupling the payload interface and the chassis which are symmetrically distributed relative to a midsagittal plane of the chassis; an electric powertrain mounted to the chassis and comprising a plurality of rail wheels; a battery electrically coupled to the electric powertrain; a set of sensors comprising: a bumper feedback sensor and a GPS sensor; and a vehicle controller mechanically coupled to the chassis (e.g., mounted to the chassis, mounted onboard the vehicle, etc.) and configured to autonomously control the electric powertrain based on measurements from the set of sensors.

In variants, the set of bumpers can include a pair of bumpers arranged at opposite ends of the electric rail vehicle along the longitudinal axis.

In variants, each bumper can include a bumper suspension defining a compression axis (e.g., parallel to the longitudinal axis), wherein the bumper feedback sensor is coupled to the bumper suspension and configured to measure an axial compressive force along the compression axis. In an example, the bumper feedback sensor is a load cell.

In variants, the vehicle controller is configured to autonomously control a motor of the electric powertrain based on the axial compressive force along the compression axis.

In variants, the payload interface can include a payload mounting surface and a pair of side panels extending upward from the payload mounting surface, wherein the pair of side panels are located on opposing sides of the payload mounting surface (e.g., the left and right sides) and define a positive draft angle relative to the payload mounting surface, wherein the payload mounting surface is substantially planar (e.g., parallelism/flatness within a threshold deviation, such as within 5 degrees, within 1 degree, within 0.1 degree, exactly planar, etc.) and orthogonal to a central axis of the bolster bowl.

In variants, the GPS sensor is arranged beneath a boundary plane defined by a superior surface of a side panel.

In variants, the set of sensors can include a camera and a set of ranging sensors, the set of ranging sensors including a LIDAR or a Radar.

In variants, the electric powertrain comprises: a traction motor and a pair of wheelsets, wherein at least one wheelset of the pair is rotatably coupled to an output of the traction motor, wherein each wheelset comprises: a split axle and a rail wheel of the plurality at each end of the split axle, wherein the electric rail vehicle further comprises a chassis suspension independently coupling each rail wheel to the chassis.

In variants, the electric rail vehicle further includes: a set of hydraulic brakes for each set of rail wheels; and a set of electromechanically actuatable parking brakes for each split axle; wherein the electric powertrain is configured to dynamically harvest energy from at least one axle by regenerative braking.

In variants, the chassis suspension can include: an anti-roll bar, coupled to each end of each split axle; and at each end of the split axle: a pair of nested coil springs; a set of chevron springs aligned with an axis of the pair of nested coil springs; and a damper.

In variants, a torsional stiffness about the lateral axis is at least triple a torsional stiffness about the longitudinal axis.

In variants, a stiffness mismatch of the chassis includes: greater torsional compliance along the longitudinal axis and greater spanwise rigidity parallel to the lateral axis.

In variants, the plurality of rail wheels defines a first axle and a second axle, wherein a torsional stiffness of the chassis about the longitudinal axis between the first and second axles is between 500,000 in*lbf/deg and 1,500,000 in*lbf/deg.

In a second set of variants, a rail system for autonomously transporting a cargo container can include a pair of electric rail vehicles, each electric rail vehicle including: a payload interface, the cargo container removably mounted to the payload interface; a chassis defining a longitudinal axis and a lateral axis perpendicular to the longitudinal axis, wherein the chassis is more torsionally compliant about the longitudinal axis than about the lateral axis; a set of bumpers mounted to the chassis, the set of bumpers comprising an outboard bumper comprising an abutment surface at a maximal extent of the vehicle along the longitudinal axis and extending beyond the cargo container along the longitudinal axis; a bolster bowl rotatably mounting the payload interface to the chassis; a plurality of suspension elements coupling the payload interface and the chassis which are symmetrically distributed relative to a midsagittal plane of the chassis; an electric powertrain mounted to the chassis and comprising a plurality of rail wheels; a battery electrically coupled to the electric powertrain; and a bumper feedback sensor coupled to the outboard bumper and configured to measure compressive force at the outboard bumper.

In variants, the bumper includes bumper suspension defining a compression axis parallel to the longitudinal axis, wherein the bumper feedback sensor is coupled to the bumper suspension and configured to measure an axial compressive force along the compression axis, wherein the vehicle controller of a first electric rail vehicle of the pair is configured to autonomously control a motor of the electric powertrain based on the axial compressive force along the compression axis.

In variants, each electric rail vehicle further comprises a GPS sensor arranged beneath a base plane of the cargo container.

In variants, a first electric rail vehicle of the pair further comprises a camera and a range sensor oriented towards a second vehicle of the pair.

In variants, each electric rail vehicle of the pair further comprises a second bumper opposite the outboard bumper along the longitudinal axis.

In variants, a longitudinal length of each electric rail vehicle is less than 12 feet (e.g., 10 feet).

In variants, the rail system further includes a spanning structure mounted to the payload interface of each electric rail vehicle of the pair, wherein the cargo container is removably mounted via the spanning structure.

2. Benefits

Variations of the technology can afford several benefits and/or advantages.

First, variations of this technology can facilitate carbon neutral and/or zero-emission rail transportation utilizing existing rail infrastructure. Second, variations of the technology can allow individual routing of a payload (e.g., cargo containers, trailers), which can reduce downtime associated with container loading, routing, and dispatching. As an example, pairs of vehicles can be independently routed to different destinations (e.g., parallel sets of tracks, distinct rail hubs, distinct ports, etc.) for loading/unloading, which can improve the operational efficiency of rail transportation. Third, variations of the technology can provide vehicle autonomy, which can reduce per-mile human operator costs, replacing the rail operator with an autonomous agent. Fourth, variations of the technology can decrease the lengthwise density of a sequence of rail vehicles. Since variants can operate without a rigid mechanical component spanning a length of the containers (at a fixed unit length), the spacing between the sequential vehicles can be varied to reduce the 'train length' to reduce the real estate requirements of the terminal. Fifth, variations of the technology can provide dynamic and/or regenerative braking (e.g., in addition to mechanical braking), which can improve speed regulation, braking performance, and energy efficiency while reducing wear on mechanical brakes, thereby reducing the associated maintenance/service requirements. In variants, the vehicle can enable speed regulation such that vehicles can stop within line of sight (e.g., using hydraulic braking, regenerative braking, and/or dynamic braking, or any combination of thereof, etc.), which can improve safety within a railway network. Sixth, variants of the technology modularize container support and locomotion by using bogies (e.g., electric vehicles) that are removably coupled to the containers. This enables the technology to accommodate different-sized containers using the same bogie set.

However, variations of the technology can additionally or alternately provide any other suitable benefits and/or advantages.

3. System

The electric vehicle 100, an example of which is shown in FIG. 1, can include: a payload interface 110, a payload suspension 120, a chassis 130, a set of bumpers 140, a sensor suite 150, a controller 160, a chassis suspension 170, and an electric powertrain 180. The electric vehicle 100 can optionally include payload adapter 105, a power source (e.g., battery 182), a cooling subsystem 184, and/or any other suitable components. However, the system 100 can additionally or alternatively include any other suitable set of components.

The payload interface 110 functions to mount a payload 102 to the electric vehicle and/or transmit forces/moments between the payload and the payload suspension. The payload interface preferably removably mounts (e.g., retains) the payload, but can alternatively permanently mount the payload. The payload interface is preferably separate from the chassis (e.g., connected by the payload suspension or other component), but can alternatively be mounted to or integrated with the chassis. The payload interface is preferably a plate which defines a flat interface along a payload base-plane (e.g., at a maximum vertical extent of the electric vehicle), but can alternatively include a set of spars (e.g., arranged along the corners of the payload interface) or be otherwise configured. The payload interface preferably spans a width of the electric vehicle and/or cargo container, but can have any other suitable geometry.

Figure 18:
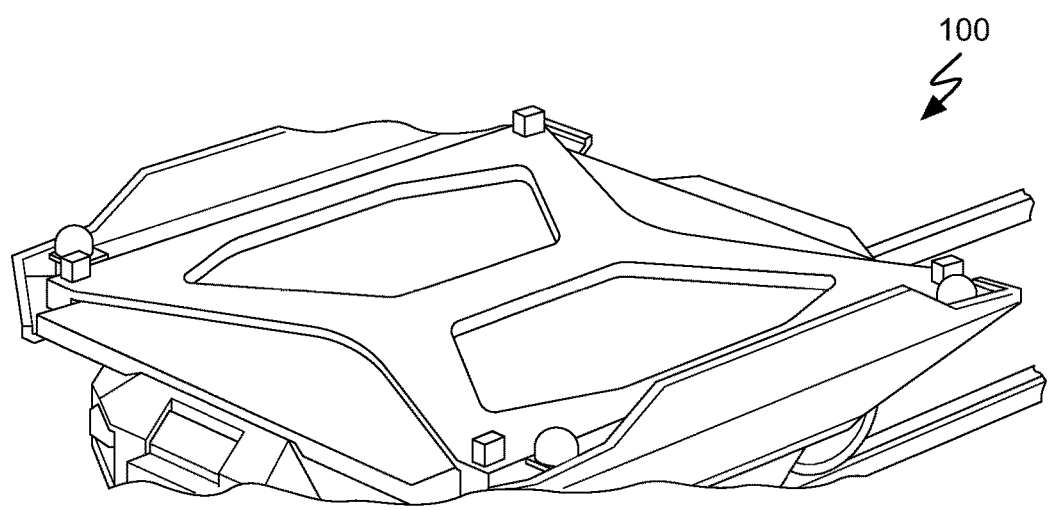
FIG. 18 is a 3D view of a payload interface in a variant of an electric vehicle system.
Figure 19:
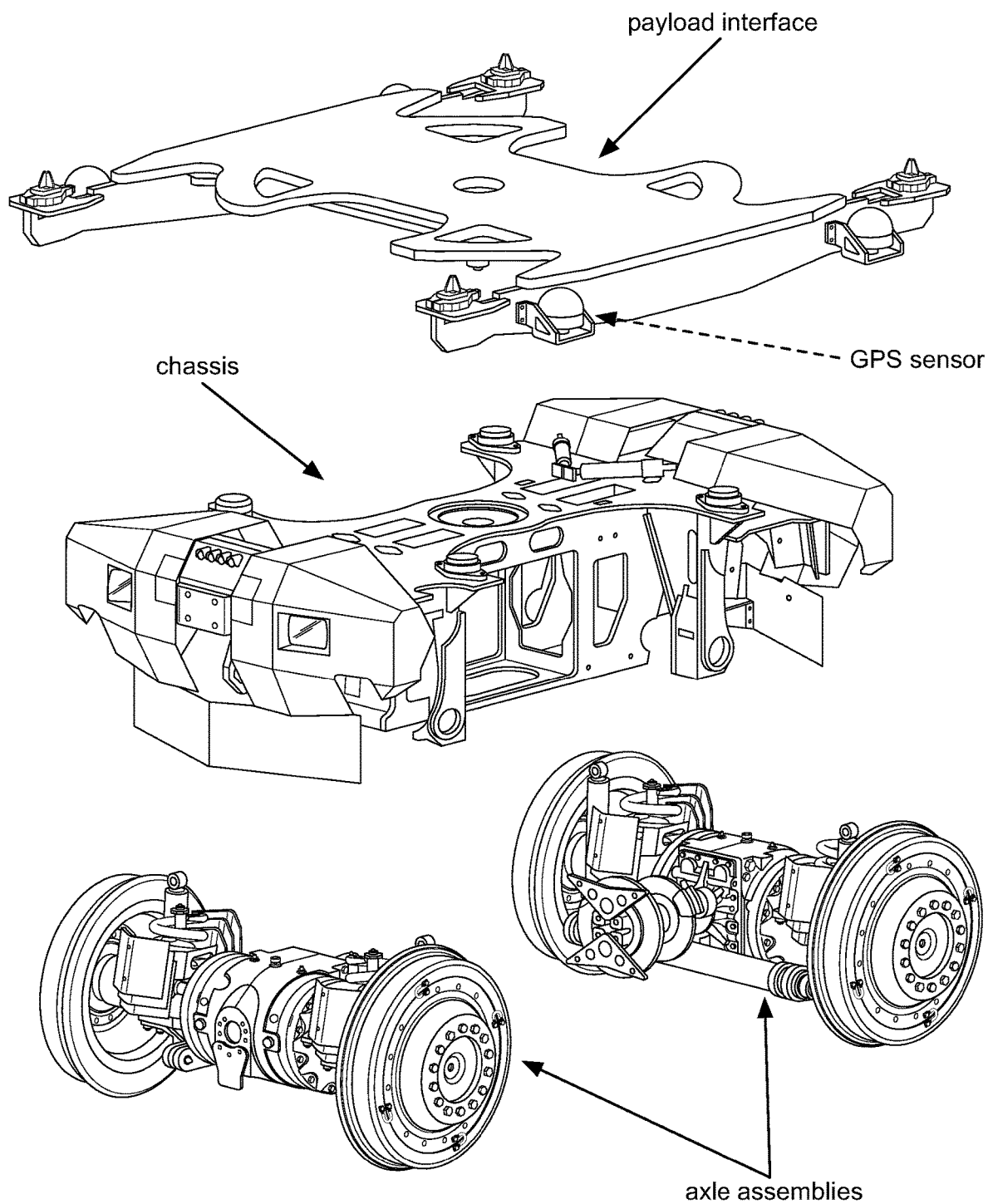
FIG. 19 is an exploded view of a variant of an electric vehicle system.

The payload interface (e.g., an example is shown in FIG. 18; a second example is shown in FIG. 19) is preferably configured to mount a standardized payload (e.g., cargo container of a predetermined dimension, such as a cargo container of at least a minimum cargo container length as shown in FIG. 25), but can additionally or alternatively be configured to mount multiple sizes and/or types of payloads. In variants, the payload interface can include a plurality of sets of payload mounting features, each set respectively associated with a one or more standardized (predetermined) payloads (e.g., 48'/53' containers; 20'/40'/45' containers; etc.). The payload interface can be removable from the chassis, permanently coupled to the chassis, reconfigurable (e.g., for box car, hopper, etc.), and/or otherwise configured.

Sets of payload mounting features are preferably inset into the payload interface and/or configured to selectively extend above a payload base-plane, but can additionally or alternatively be configured to persistently extend above a payload base plane—such as in a position which does not impinge/encroach on payloads which utilize separate sets of payload mounting features. The payload mounting features can be removable, retractable, actively stowable, and/or otherwise mounted relative to the payload interface. The payload mounting features can optionally include communication features (e.g., data and/or power connectors) to connect to electronic systems in the cargo, sensors, and/or other auxiliary components.

In an example, a first set of 4 payload mounting features define a first width and are configured to mount a first type of cargo container and a second set of 4 payload mounting features define a second width and are configured to mount a second type of cargo container, wherein the second width is greater than the first width. In the first example, if the first set of mounting features protruded above a cargo base-plane, they might interfere with the mounting of the second type of cargo container via the second set of mounting features. In another example, the payload interface can include 4 mounting features arranged in the payload interface corners, wherein only two mounting features engage the cargo (e.g., at the corner castings) and the other pair (e.g., arranged below the body of the cargo) are retracted into the payload interface.

Mounting features can be utilized with any suitable hardware including mechanical fasteners, clasps, latches (e.g., spring loaded, etc.), locks, active retention mechanisms (e.g., hydraulic, pneumatic, electromechanical), passive retention mechanisms (e.g., spring loaded, positive locking, twist locks, kingpin of a fifth wheel, etc.), and/or any other suitable retention/mounting components. However, the payload interface can be otherwise suitably fixed (e.g., rigidly mounted) to the payload interface (e.g., such as via a payload adapter).

The payload interface is preferably configured to mount to one end of a unitary payload (e.g., forward or rearward end of a cargo container), but can additionally or alternatively be configured to connect to a front end of a first payload and a rear end of a second payload, mount a stacked payload (e.g., mount a rear or forward end of a first cargo container having a second cargo container stacked vertically above and/or mounted to the first cargo container), mount along a cargo container body and/or can be otherwise suitably configured. Alternatively, the payload interface can be configured to mount one end of a torsional-stiffening member (e.g., spanning structure cooperatively supported by a pair of vehicles; providing longitudinal stiffness with lateral compliance), such as a container chassis, which can mount a payload, and/or can be configured to operate without an attached payload. The payload interface preferably mounts to the bottom of the payload (e.g., bottom of an intermodal container), but can additionally or alternatively mount to the side, top, end, corners, and/or any other portion of the payload.

Figure 23:
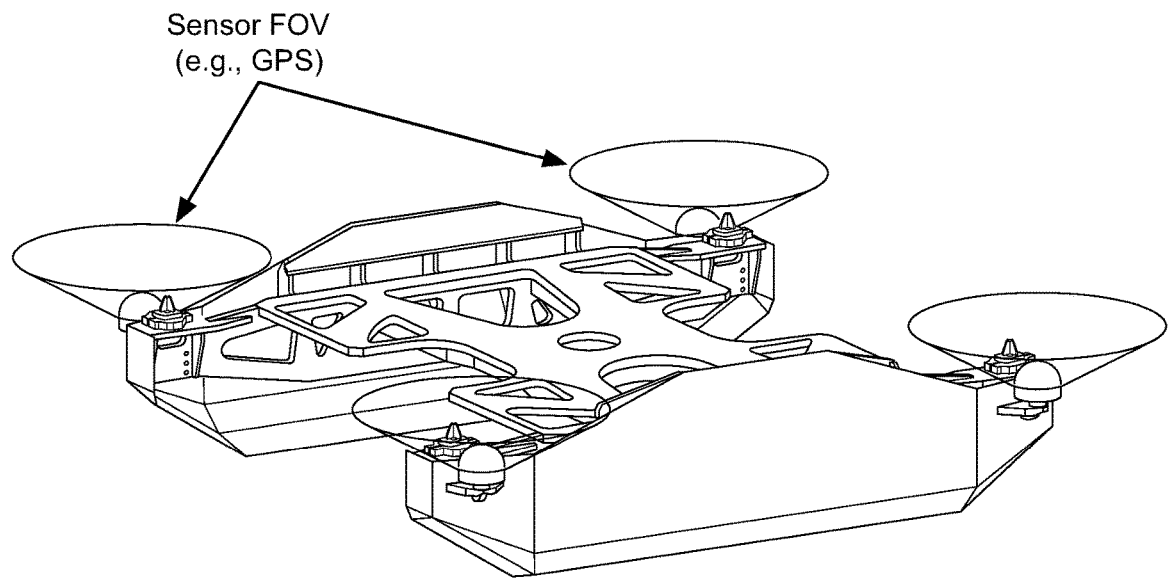
FIG. 23 is a 3D view representation illustrating an arrangement of sensors relative to a payload platform.

In variants, a payload interface and/or spanning structure connected to the payload interface can include side panels (a.k.a. side rails) or guide pieces configured to facilitate the alignment/mounting of cargo containers to the payload interface and/or to shield/protect the GPS sensors during payload mounting. Side rails can be integrated into the payload interface or a spanning structure, or can be bolted, fastened, or otherwise attached. Side panels can be: substantially planar (e.g., constrain departures of a payload during mounting to a flat boundary), arcuate (e.g., constraining the payload along a curved boundary), and/or have any other suitable geometry. In variants, the payload interface can include (or define) a payload mounting surface and a pair of side panel extending upward from the payload mounting surface, the pair of side panels on opposing sides of the midsagittal plane and defining a positive draft angle relative to the payload mounting surface, wherein the payload mounting surface is substantially planar (e.g., parallelism/flatness within a threshold deviation, such as within 5 degrees, within 1 degree, within 0.1 degree, exactly planar, etc.) and orthogonal to a central axis of the bolster bowl. In variants, the GPS sensor is arranged beneath a boundary plane defined by a superior surface of a side panel (e.g., which can constrains departures of a payload during mounting) and/or below a base mounting plane of a payload (e.g., an example is shown in FIG. 19). In an example: side panels can include cutouts to avoid extending into the field of view (FOV) of GPS sensors (e.g., oriented substantially vertically; an example is shown in FIG. 23; where GPS sensors are arranged outboard of a maximum payload width dimension, such as in the example shown in FIG. 24). However, the payload interface can otherwise exclude side panels.

However, the electric vehicle can include any other suitable payload interface.

Figure 9:
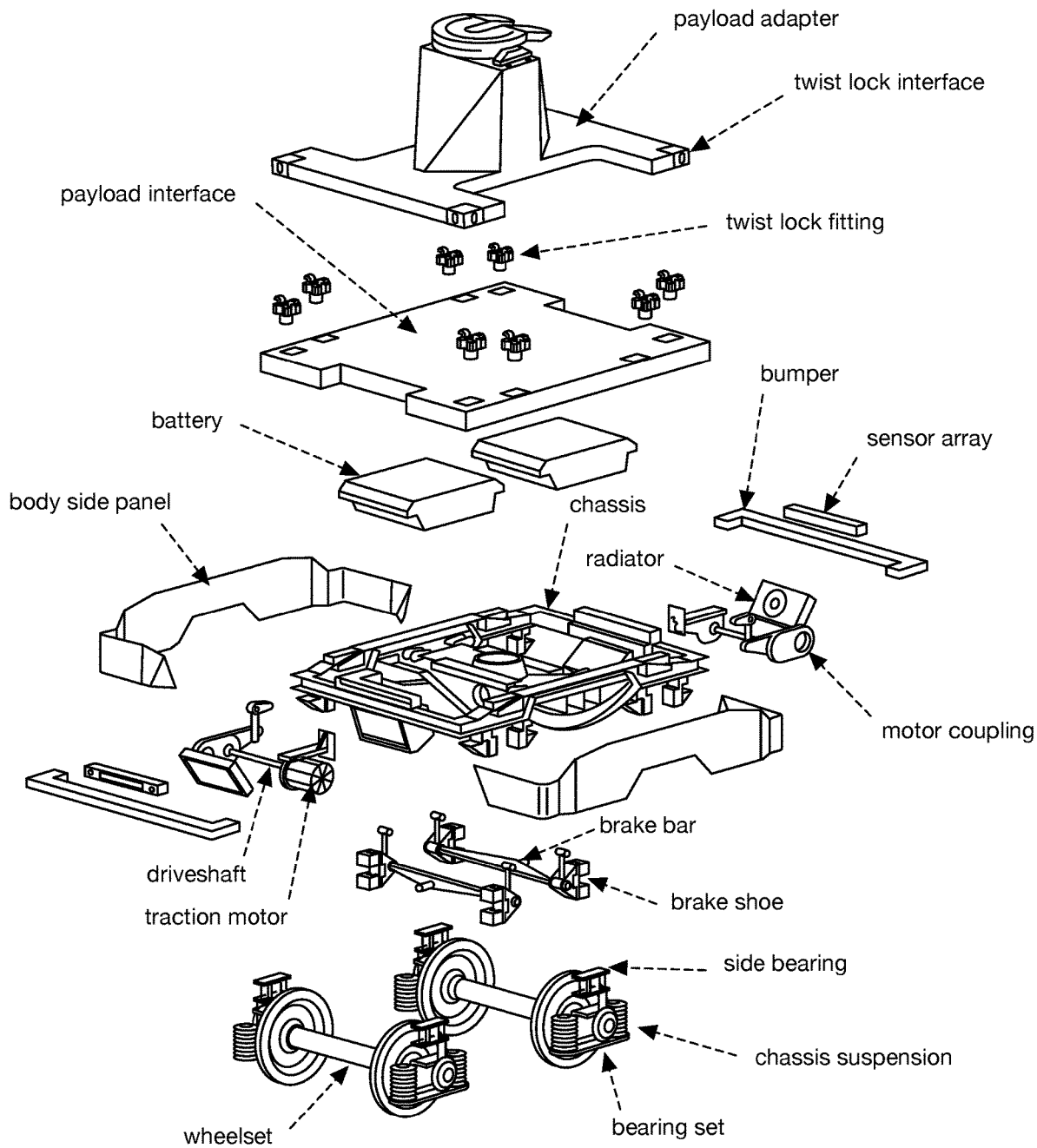
FIG. 9 is an exploded isometric view of a variant of the electric vehicle system.
Figure 11:
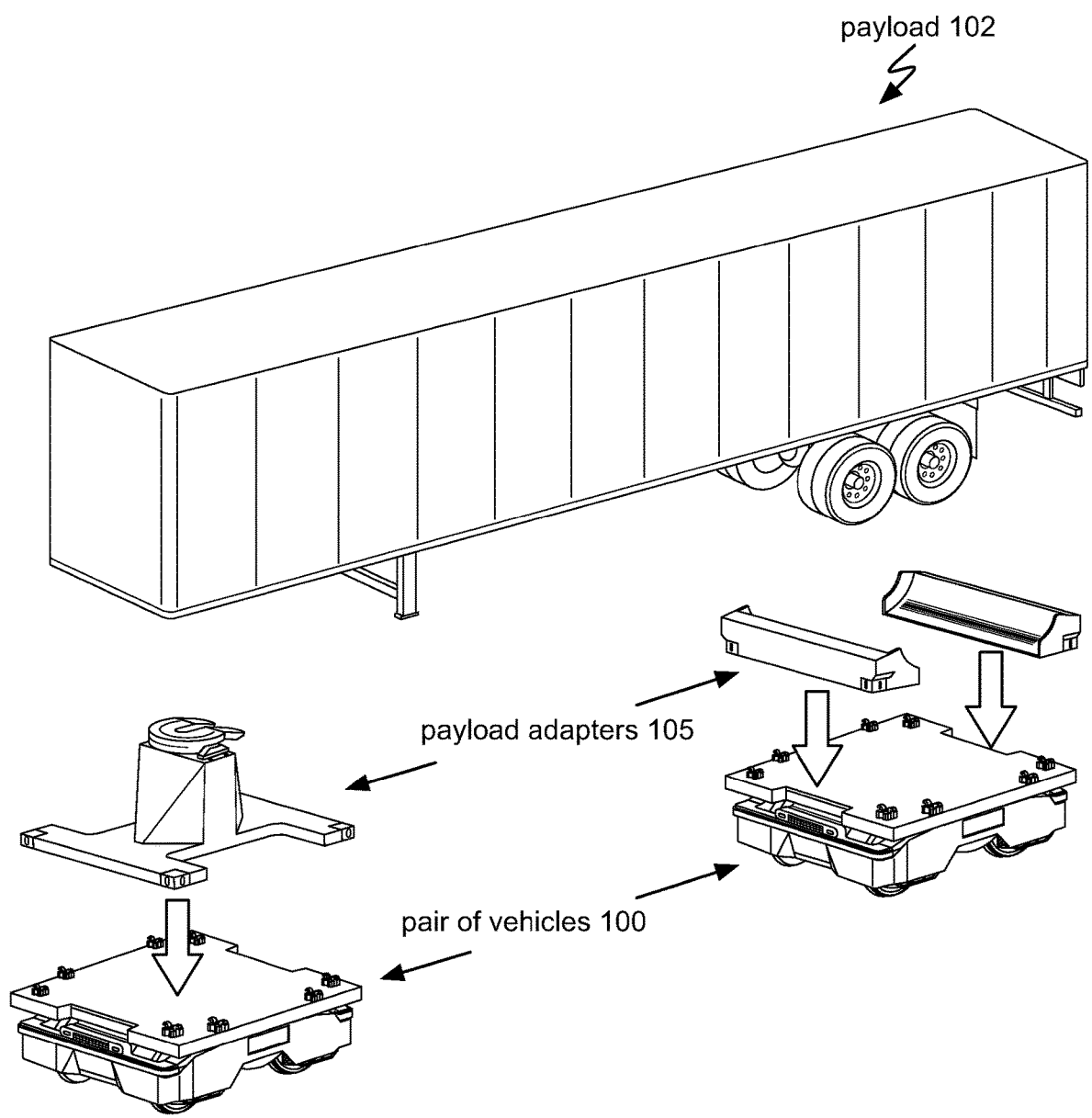
FIG. 11 is an exploded isometric view of an example configuration of a variant of the electric vehicle system.
Figure 12A:
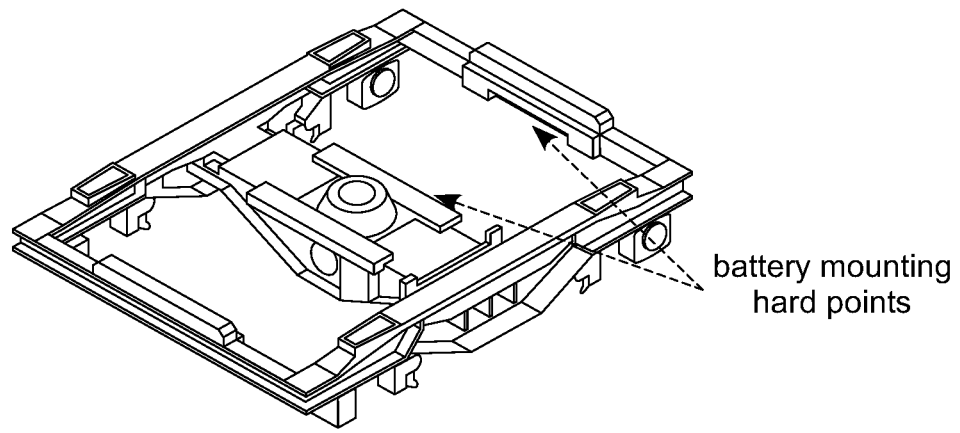
FIG. 12A-C are isometric view representations of a first, second, and third example of the chassis in a variant of the electric vehicle system, respectively.
Figure 12B:
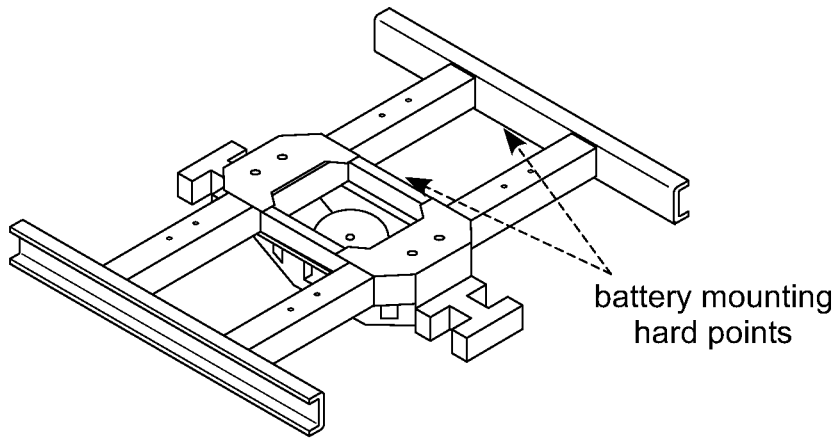
Figure 12C:
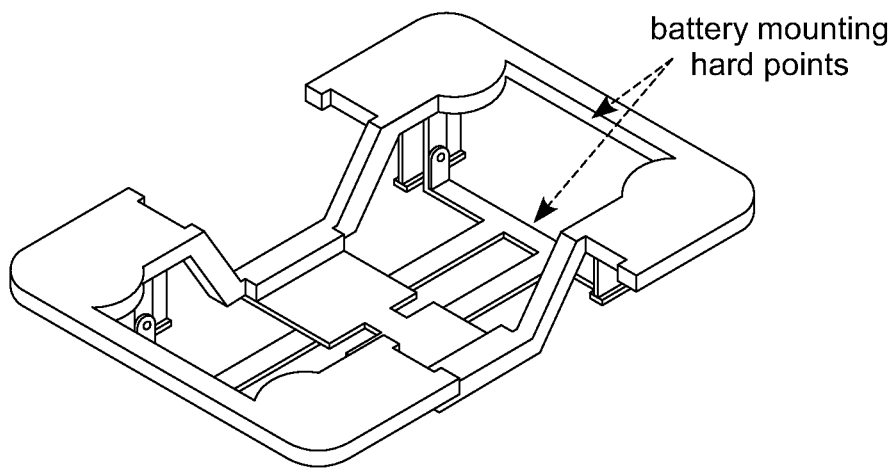

The optional payload adapter functions to conform the payload interface to an irregular (e.g., arcuate, rotatable, non-rectilinear, etc.) payload. The payload adapter can be selectively mounted to the payload interface—such as to accommodate a specific payload. In variants, the payload adapter(s) can be configured to mount other objects including wheeled structures intended to mate with semi-trailers (e.g. semi-trailers or intermodal containers loaded onto chassis, etc.) to the payload interface. In such variants, there can be a single payload adapter which connects the payload to the vehicle, and/or multiple payload adapters which cooperatively connect one end of a payload to the payload interface (examples are shown in FIG. 11). In a first example, the payload adapter can include a fifth-wheel coupling (e.g., configured to mount to a leading end of a trailer, telescoping fifth-wheel, etc.; an example is shown in FIG. 9; a second example is shown in FIG. 28A). In a second example, the payload adapter can include wheel chocks configured to retain the wheels of a trailer (e.g., an example is shown in FIG. 28B). However, the vehicle can otherwise include any other suitable payload adapter(s) and/or otherwise exclude a payload adapter.

However, the electric vehicle can otherwise exclude a payload adapter and/or include any other suitable payload adapter.

The payload suspension 120 functions to dampen force (shock) transmission between the payload interface 110 and the chassis 130. Additionally or alternatively, the payload suspension can function to introduce compliance in various axes (e.g., relative to the payload) to ensure each axle/wheel of the electric vehicle can remain appropriately coupled to the track. In some variants, the payload suspension can additionally function to react and/or dampen torsional moments to reduce lateral oscillation of the vehicle and/or payload (e.g., commonly known as 'truck hunting').

In some variants, the payload suspension 120 can provide pitch, roll, and/or lateral shear stiffness. The payload suspension can include spring and/or damping elements arranged in any suitable distribution. Spring and/or damping elements can include: 'chevron' springs, coil springs, anti-roll bars (e.g., providing roll stiffness with a lateral spanning torsional member, providing more than 5×, 10×, 20×, etc. more stiffness in roll than the chassis suspension elements, etc.), dampers (e.g., automotive dampers), side bearers, air springs, and/or any other suitable components. The payload suspension 120 preferably includes one or more pairs of opposing suspension elements arranged between the chassis and payload interface (e.g., mounted to the chassis side and/or the payload interface side), but can be otherwise configured. The suspension elements can be arranged along: the left, right, front, back, corners, and/or in any other suitable location on the chassis and/or payload interface.

Figure 6:
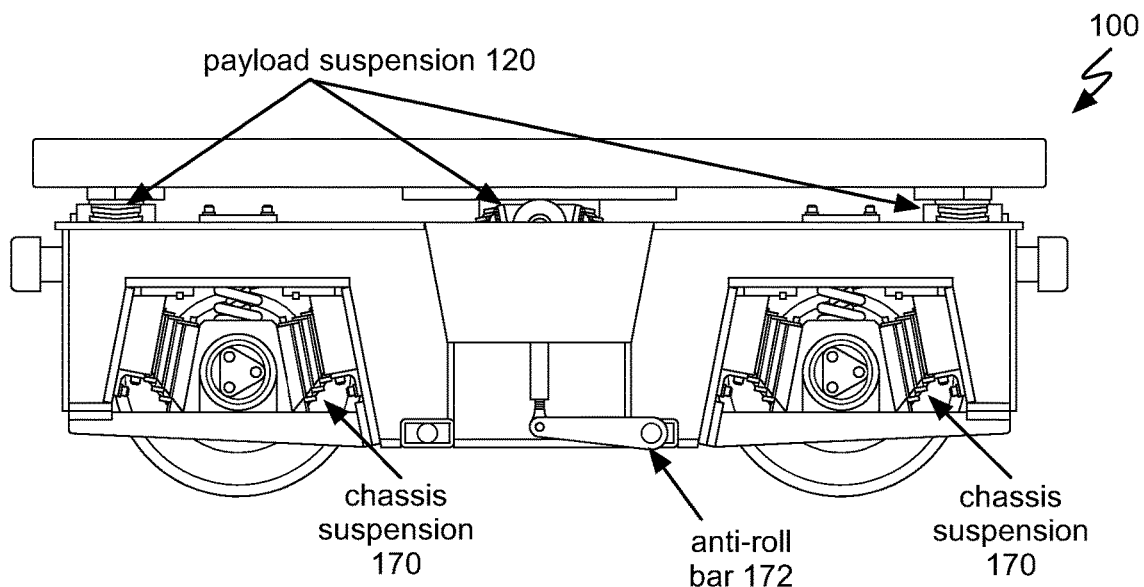
FIG. 6 is a side view representation of a variant of the electric vehicle system.
Figure 8:
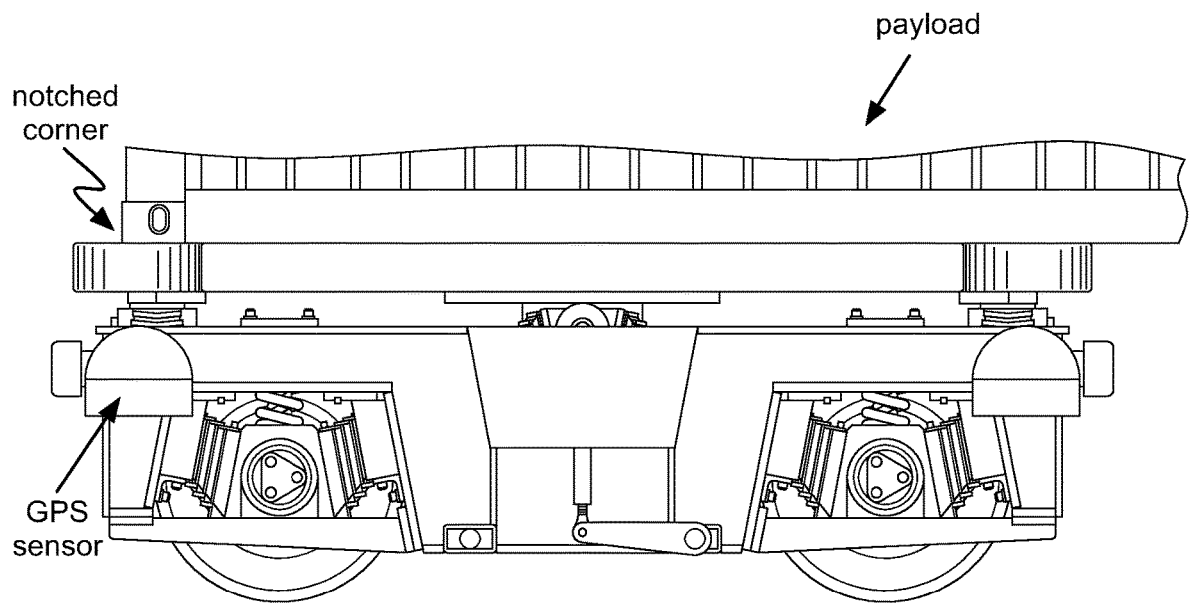
FIG. 8 is a side view representation of a variant of the electric vehicle system.

In a first example, the payload suspension can include a pair of chevron springs symmetric about a midsagittal plane of the vehicle (e.g., left-right spring pair), each chevron spring connected to the chassis and coupled the payload interface (e.g., slidably), the pair additionally connected by an anti-roll bar (e.g., beneath the chassis, etc.; an example is shown in FIGS. 6 and 8; reacting payload roll moments without passing them through the chassis; etc.). The pair can be arranged substantially along a pitch axis of the vehicle (and/or pitch axis of the payload interface; intersecting the pitch-yaw plane, etc.), centered (longitudinally) between each set of mounting features, arranged at a longitudinal midpoint of the payload interface.

In a second example, the payload suspension can include two pairs of diametrically opposing suspension elements (e.g., relative to the yaw axis of the vehicle and/or payload interface). The two pairs are preferably pairwise symmetric about the midsagittal plane of the vehicle, but can be otherwise suitably arranged.

However, the payload suspension can include any other suitable spring and/or damping elements arranged in any suitable distribution.

Figure 3:
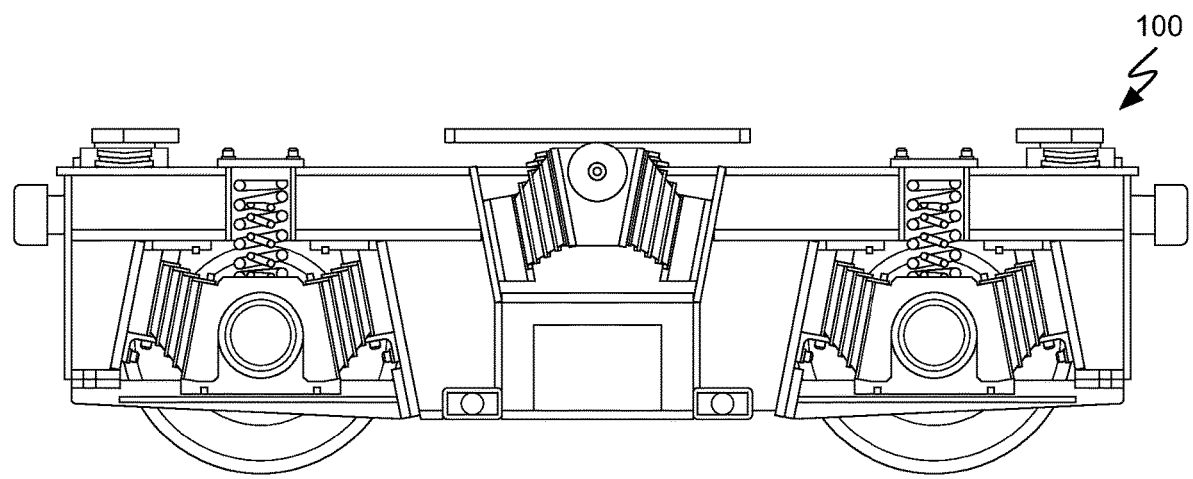
FIG. 3 is partial side view cross-sectional representation of a variant of the electric vehicle system.

In variants, the payload suspension can additionally provide stiffness (and/or compliance) about a rotational degree of freedom (e.g., yaw rotation) between the payload interface and the chassis. The rotational degree of freedom of the payload suspension is preferably aligned (e.g., coaxial) with a vertical axis of the vehicle, but can additionally or alternatively be arranged in any suitable position along a midsagittal plane of the vehicle and/or can be otherwise suitably arranged. In such variants, the rotational interface can be analogous to a planar bearing, sleeve (plain) bearing, $5^{th}$ wheel coupling, truck bolster, and/or any other suitable rotational interface. In a first example, the payload suspension can include a roller and/or bearing interface (e.g., wear surface; on a lower surface of the payload interface; etc.) at each suspension element (an example is shown in FIG. 3).

In a first set of variants (e.g., examples of which are shown in FIGS. 2A-C, FIG. 3, and FIG. 6), the payload interface is rotatably coupled to the payload to the chassis with a planar bolster bowl.

In a second set of variants (e.g., examples are shown in FIGS. 9, 19, 21, and 27), the payload interface is rotatably coupled to the payload to the chassis with a spherical bolster bowl.

However, the payload suspension can otherwise suitably provide rotational compliance.

Figure 2A:
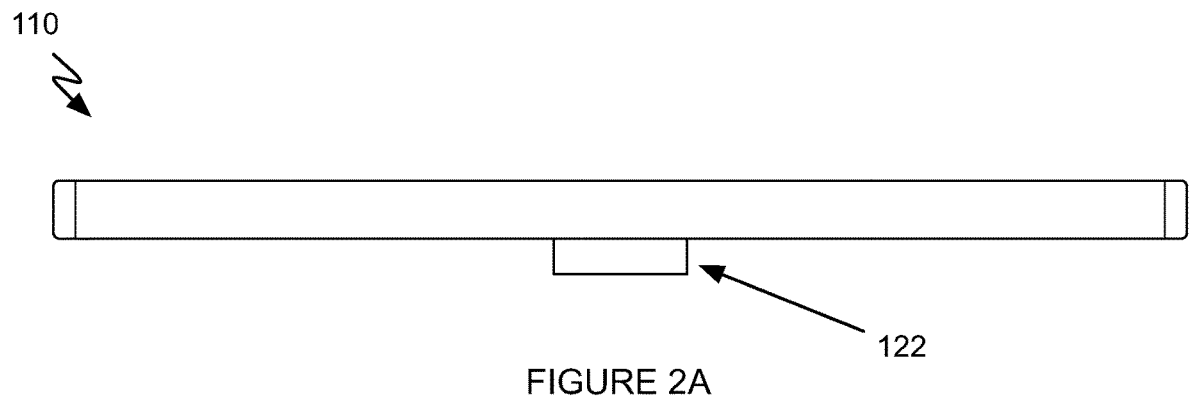
FIG. 2A is a side view of a payload interface in a variant of the electric vehicle system.
Figure 2B:
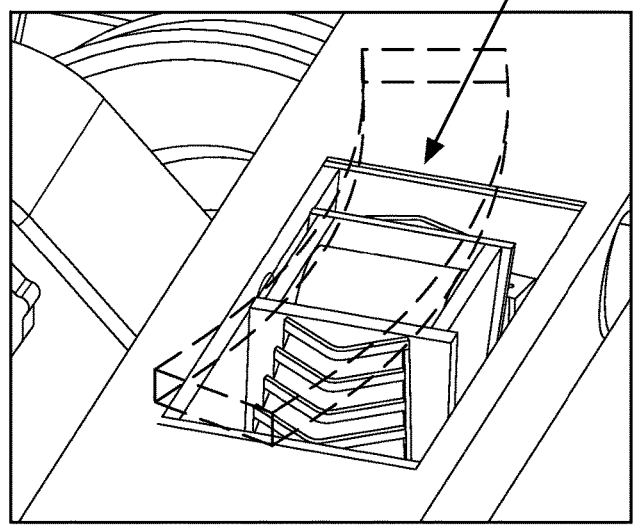
FIG. 2B-C are a partial isometric view and a partial cross-sectional view representation, respectively, of a shear feature of a payload interface in a variant of the electric vehicle system.
Figure 2C:
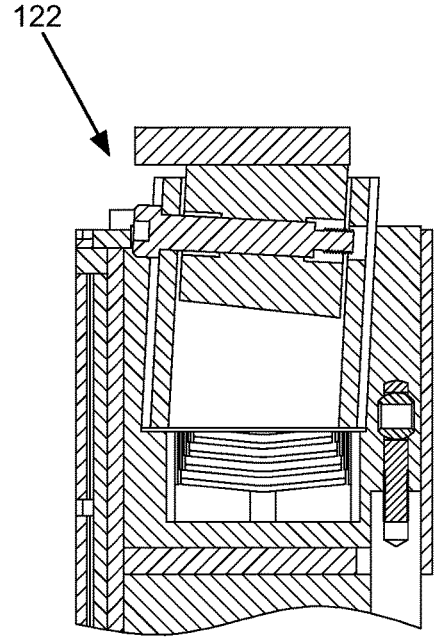

In variants, the payload suspension can include a shear feature(s) 122 and/or a tension rod(s) which functions to transmit propulsive and/or braking forces between the chassis and the payload. The shear feature can include a rotationally symmetric feature of the payload interface (e.g., symmetric about the rotational degree of freedom of the payload suspension) which engages a corresponding feature of the chassis (e.g., male-female nesting. In a first example, the shear feature can be a kingpin (e.g., integrated into a $5^{th}$ wheel coupling). In a second example, the shear feature can be a cylindrical or conical boss protruding from a base of the payload interface (e.g., an example is shown in FIG. 2). In a third example, the shear feature can engage a corresponding bearing surface of the chassis (e.g., roller, polymeric layer, bolster bowl, etc.; an example is shown in FIGS. 2B-C) or a shear-only connection (e.g., minimal or no axial loading). In an illustrative example, the shear feature can include a roller surrounded by and/or mounted by chevron springs. In a fourth example, shear features can include a shear rod and/or an A-frame to carry tensile loads. However, the payload suspension can include any other suitable shear feature(s) and/or otherwise suitably transmit propulsive and/or braking forces between the chassis and the payload.

In variants, the portions of the payload suspension can be lubricated (e.g., with $5^{th}$ wheel grease, bearing lubricant, etc.), self-lubricating, unlubricated, and/or otherwise suitably configured.

In variants, the payload suspension can axially retain the payload interface relative to the chassis (e.g., along a vertical and/or yaw axis); however, the payload interface can otherwise be removably and/or gravitationally coupled to the payload suspension (e.g., in one or more configurations).

However, the electric vehicle can include any other suitable payload suspension.

Figure 7:
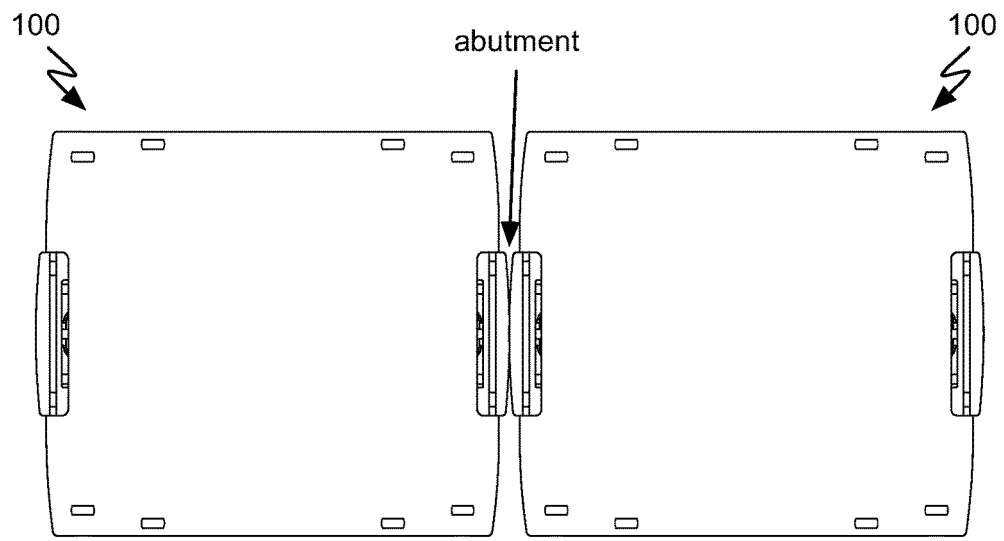
FIG. 7 is a top view representation of a pair of abutting vehicles in a variant of the electric vehicle system.

The chassis 130 functions to structurally support the payload interface and additionally or alternatively functions to house and/or mount the electric powertrain, controller, battery, sensor suite, cooling components, and/or any other suitable components. Additionally or alternatively, the chassis can function to mount the bumper(s) and/or react compressive (e.g., impulse) loads between the bumper and a payload platform and/or bumper to bumper contact (e.g., platooning abutment, an example is shown in FIG. 7; as described in U.S. application Ser. No. 17/335,732, filed 1 Jun. 2021, which is incorporated herein in its entirety by this reference). The chassis can include: bumper support members (e.g., at a front/rear end, mounting front/rear nodes of the payload suspension), side frame members (e.g., left/right side of the vehicle, mounting left/right nodes of payload suspension), cross members (e.g., extending laterally between side frame members, extending longitudinally between bumper support members; mounting battery; etc.), retaining members (e.g., outboard relative to wheels, axially retaining wheels in one or more configurations, etc.), and/or any other suitable members/elements.

Figure 5:
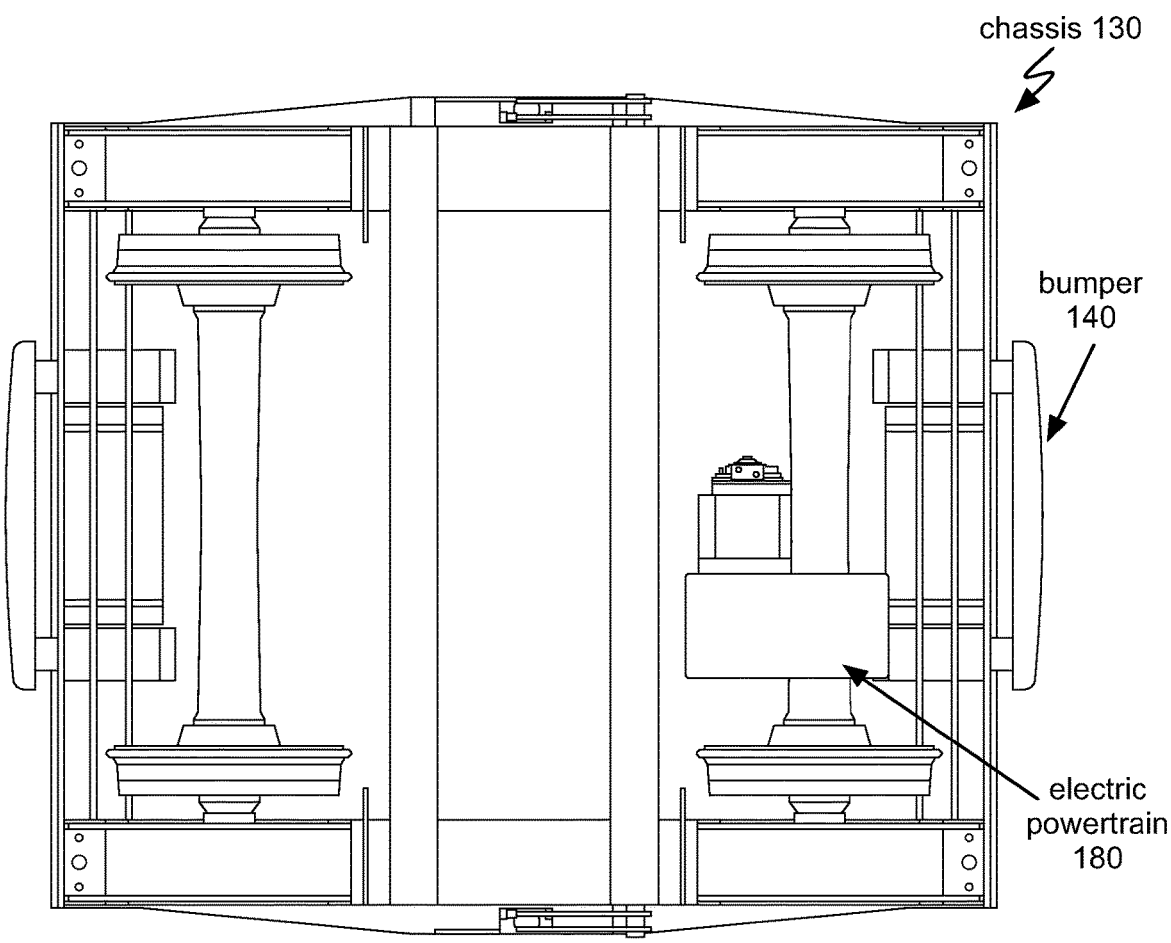
FIG. 5 is a bottom view of a variant of a chassis in a variant of the electric vehicle system.
Figure 21:
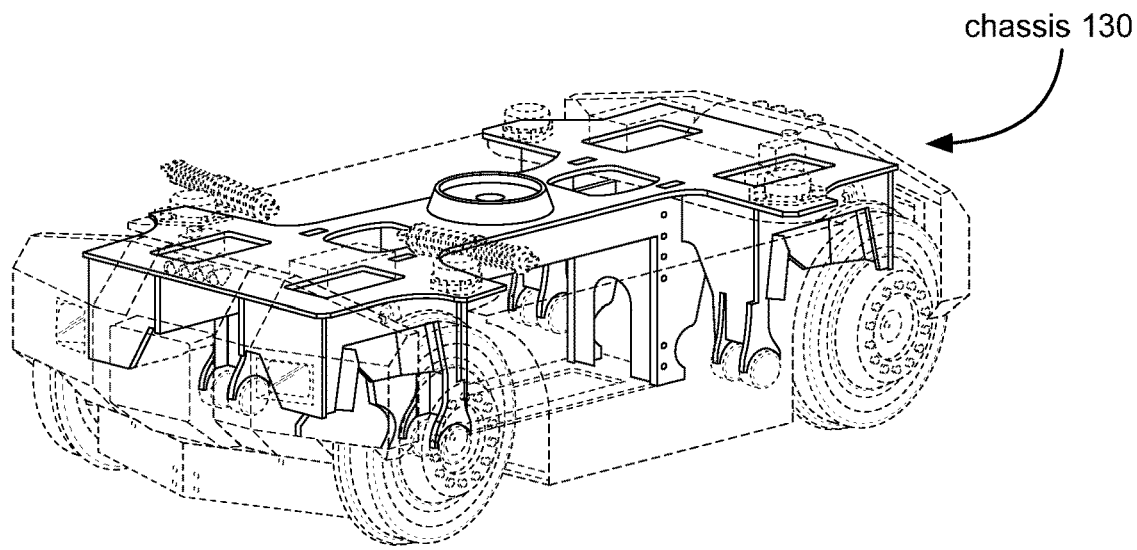
FIG. 21 is an isometric view of a chassis, illustrating an arrangement relative to a chassis in a variant of the electric vehicle system.

In variants, the members of the chassis can include a stiffness mismatch and/or asymmetric bend strength which can advantageously provide torsional compliance (e.g., relative to 'twisting' of the rail; longitudinally) to allow wheel load equalization (e.g., on undulating track). Additionally or alternatively, a stiffness mismatch may dampen lateral oscillations of the vehicle ('truck hunting') and shock resulting from bumper contact. As an example, the chassis can be formed with downward facing 'C-channel' elements or 'inverted U' members, spanning laterally across a width of the vehicle, which provide low torsional stiffness (about a long axis of the member) while simultaneously providing high bending stiffness (e.g., in a spanwise direction; a first example is shown in FIG. 5, a second example is shown in FIG. 21). In a second example, the chassis and/or vehicle body can define a neck (e.g., with a narrower width toward the middle of the vehicle length). The resultant lateral stiffness (e.g., torsional stiffness) is preferably lower than the resultant longitudinal stiffness (e.g., torsional stiffness), but can alternatively be higher or substantially equal. However, the chassis can include any other members and/or elements with any appropriate cross-sectional geometries.

In variants, the chassis can include additional damping and/or vibration isolation of various components mounted thereto—such as electronics (e.g., controller), sensors, batteries, and/or any other suitable components. Examples of battery mounting are shown in FIGS. 12A-C and FIG. 16.

In variants, the chassis can be assembled (e.g., bolted, riveted, welded, etc.), cast, or otherwise formed into a unitary body.

In variants, the chassis can have a torsional stiffness of about 1e6 in*lbf/deg (e.g., within 50%, within 30%, within 20%, within 10%, within 5%, exactly, etc.; longitudinally between the front and rear axles) which can improve wheel load equalization in various loading configurations (e.g., to satisfy regulatory wheel load equalization tests, etc.). As an example, many three-piece bogies may be intentionally compliant about the y-axis to permit the axles to assume different roll angles to follow rough track and maintain appropriate wheel loads, but this strategy may result in degraded dynamic performance in various operating conditions (e.g., high stiffness between the traction motor and wheels may allow the drone to meet deterministic dynamic performance metrics). The drone's chassis instead permits differential axle roll angle via a torsionally-compliant structure between the axles along the longitudinal axis of the vehicle (i.e., x-axis).

Figure 22:
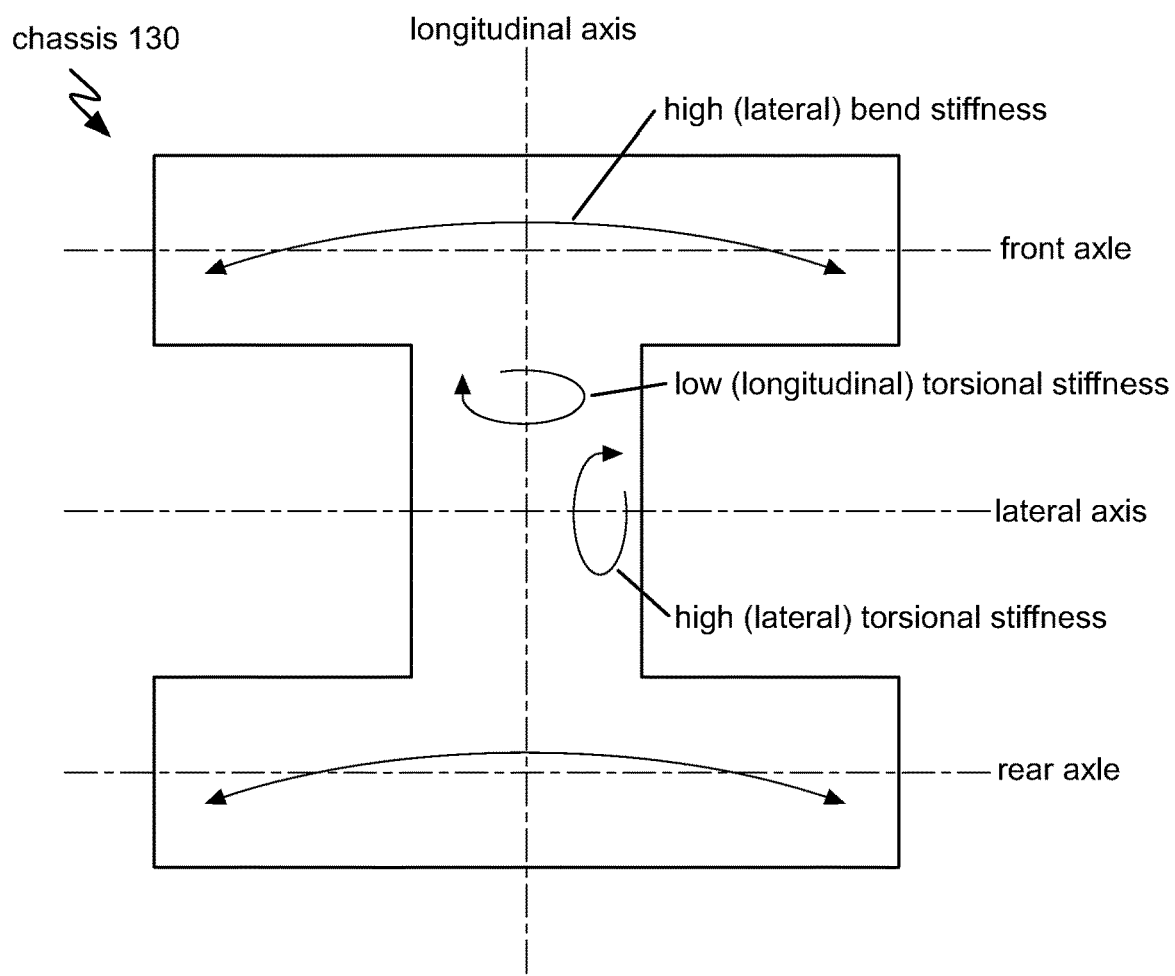
FIG. 22 is a schematic representation of a variant of a chassis, illustrating relative compliance and/or stiffnesses in various axes in a variant of the electric vehicle system.

In one set of variants, the chassis can define a longitudinal axis and a lateral axis, with the front and rear axles substantially parallel to the lateral axis. The chassis preferably has a high lateral bend stiffness adjacent to the axles, and a low longitudinal torsional stiffness between the axles (e.g., an example is shown in FIG. 22). In variants, the proportion of the torsional stiffness relative about the lateral axis relative to the torsional stiffness about the longitudinal axis (e.g., between the axles) can be: less than 100%, 100%, 200%, 300%, 500%, 1000%, greater than 1000%, any open or closed range bounded by the aforementioned values, and/or any other suitable stiffness. In a first specific example, the torsional stiffness about longitudinal axis (between the front and rear axles; along a mid-section of the vehicle) is at least triple the lateral torsional stiffness. In a second specific example, the torsional stiffness about lateral axis (e.g., around an axle and/or suspension hardpoints) is at least triple the longitudinal torsional stiffness. In variants, a stiffness mismatch of the chassis includes: greater torsional compliance along the longitudinal axis and greater spanwise rigidity parallel to the lateral axis. In variants, the torsional stiffness of the chassis about the longitudinal axis between the first and second axles can be: less than 100,000 in*lbf/deg, 100,000 in*lbf/deg, 250,000 in*lbf/deg, 500,000 in*lbf/deg, 750,000 in*lbf/deg, 1,000,000 in*lbf/deg, 1,250,000 in*lbf/deg, 1,500,000 in*lbf/deg, 2,000,000 in*lbf/deg, 5,000,000 in*lbf/deg, 10,000,000 in*lbf/deg, greater than 10,000,000 in*lbf/deg, any open or closed range bounded by the aforementioned values, and/or any other suitable torsional stiffness. In variants, the ratio of the first and second moments of inertia of the chassis (e.g., entire body and/or between the axles) can have any suitable proportionality, such as: less than 0.01, 0.05, 0.1, 0.25, 0.5, 0.75, 1, 2, 3, 5, 10, 50, 100, greater than 100, any open or closed range bounded by the aforementioned values, and/or any other suitable proportionality. However, the chassis can have any other suitable stiffness or compliance about any suitable axes (e.g., in bending and/or torsion).

However, the electric vehicle can include any other suitable chassis.

The set of bumpers 140 functions to dampen shock resulting from (longitudinal) contact/compression in the direction of traversal along the rail, such as might arise from abutment while platooning. Additionally or alternatively, the bumper contact force/displacement can provide a measurable input for control/navigational coordination relative to an adjacent vehicle, such as during periods acceleration, coordinated propulsion, and/or coordinated braking. The vehicle can include: one bumper, two bumpers (e.g., diametrically opposed), and/or any other number of bumpers. The bumpers are preferably mounted to the vehicle, but can alternatively be mounted to another component (e.g., the container), wherein the bumper sensor measurements be provided to the vehicle (e.g., via a wired or wireless connection). The bumpers are preferably arranged along the front and back of the vehicle (e.g., leading and trailing edge, respectively; longitudinally outboard of a cargo payload at a respective end of the vehicle), but can be arranged along the vehicle sides and/or otherwise arranged.

Preferably, the vehicle includes a front bumper and a rear bumper symmetric about a frontal midplane of the vehicle that are substantially similar, however the front and rear bumpers can additionally or alternatively be different (e.g., having unique force vs displacement curves), asymmetric, and/or otherwise suitably configured. Alternatively, the vehicle can exclude a front and/or rear bumper, and/or can be otherwise suitably configured. Preferably, each bumper is symmetric about a midsagittal plane of the vehicle and connects to the chassis at two points which span an element of the payload suspension. Alternatively, each bumper can mount in the center (e.g., along a longitudinal centerline) and direct force down the spine of the vehicle. However, the bumper(s) can be otherwise suitably arranged. The contact surfaces 142 of bumpers (e.g., along the leading edge of a forward bumper or trailing edge of a rearward bumper) are preferably arcuate (convex or bowed outward from a gravitational axis, etc.), but can include a flat or planar peripheral face, or can be otherwise suitably configured.

In a specific example, the span and/or curvature of each bumper can be specified based on the maximum curvature of a standard rail and/or the maximum angle between adjacent payloads/vehicles on a maximally curved rail.

Figure 4:
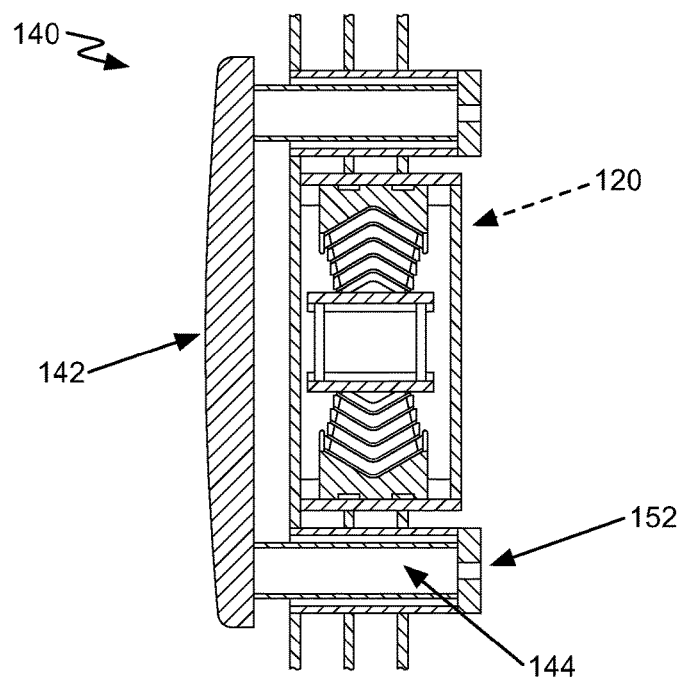
FIG. 4 is a partial top view cross-sectional representation of a variant of the electric vehicle system.

The connection(s) between the bumper and the chassis can be damped and/or sprung: axially (e.g., in the direction of bumper compression; along a compression axis of the bumper) and/or laterally (e.g., mitigating out-of-plane contact loads arising from rail curvature, etc.). Connections between the chassis and the bumper can include circumferential damping elements 144 (an example is shown in FIG. 4), axial compression elements (e.g., coil springs), and/or any other suitable components.

In one set of variants, the connection between the bumper and the chassis can include (or define) a bumper suspension which mounts the bumper to the chassis and defines a compression axis substantially parallel with a longitudinal axis of the chassis. As a first example, the compression axis can be defined by two parallel cylinders with coil springs providing damping in line with the cylinder length (e.g., which may be damped to mitigate forces/moments not aligned with the compression axis and/or coil springs; an example is shown in FIG. 4). Alternatively, a compression axis can be defined along a single element suspension (e.g., spring-loaded plunger with a square cross or other non-cylindrical cross-section), and/or can be otherwise suitably defined.

In variants, it can be desirable for bumpers to readily displace across a first force regime (e.g., shallow slope of a force vs displacement curve, low spring constant; for abutment sensing/coordination) while providing shock resilience across a second force regime (e.g., high spring constant—such as greater than 10 times the spring constant of the first force regime; progressive spring constant). As an example, multi-regime stiffness and/or displacement can be achieved along a compression axis of the bumper (and/or bumper suspension) by utilizing a multi-element suspension (e.g., nested coil springs of different spring constants, multiple elements of spring/damping engaging along different regimes of displacement along the compression axis, etc.). As a second example, multiple regimes of stiffness can be achieved through control of an active (or semi-active) bumper suspension. However, the bumpers can have any other suitable spring/damping characteristics along a compression axis.

In variants, the bumper(s) and/or bumper suspension are preferably significantly more compliant than the (longitudinal) compliance of the driven axle(s) mounting suspension, such that approximately two orders of magnitude separate the natural frequency of the bumper from the chassis suspension (e.g., bumper at 0.5 Hz and suspension at 50 Hz; more than one order of magnitude; frequency ratio of 20, 50, 100, greater than 100, etc.).

The connection(s) between the bumper and the chassis can include any suitable force and/or displacement sensors, such as: load cells, strain gages, proximity sensors (e.g., optical), and/or any other suitable bumper feedback sensors of the sensor suite (e.g., coupled to the compression axis).

However, the electric vehicle can include any other suitable bumper(s).

The power source functions to power components of the vehicle. The power source can be: a set of charging contacts (e.g., charging rail contacts), a battery, a fuel conversion system (e.g., a fuel cell and fuel storage, etc.), a combination thereof, and/or any other power source. The vehicle can include one or more power sources. The power source is preferably mounted to the vehicle (e.g., chassis), but can alternatively be mounted to the container, be located off-board the vehicle, or be otherwise arranged.

In variants, the battery 182 functions to store electrochemical energy in a rechargeable manner and/or can function to supply electrical energy to the vehicle. The battery preferably includes a lithium-based battery chemistry, which can include: a lithium-ion battery, lithium cobalt oxide battery, a lithium ion manganese oxide battery, a lithium ion polymer battery, a lithium iron phosphate battery, a lithium-sulfur battery, a lithium-titanate battery, a thin film lithium ion battery, a lithium ceramic battery, and/or any other suitable lithium-based battery chemistry. However, the batter(ies) can include any other suitable chemistry for the storage and release of electrical energy, such as sodium-ion batteries and/or any other suitable batteries. In variants, chemistries which are low cost and have low power density and/or low energy density can be particularly well suited to rail applications, where the vehicle is less mass constrained (e.g., when compared to electric aviation and/or roadway transportation). The electric vehicle can include: one battery pack per axle, one battery pack per motor controller, one battery pack per motor, a single battery pack for the electric vehicle, multiple (redundant) battery packs (e.g., 2 duplicative battery packs, more than 2, etc.) and/or any other suitable number of battery packs. In a specific example, batteries can be mounted on opposing sides (e.g., left/right sides) of a torsionally-compliant, longitudinal chassis member, between the front and rear axles of the vehicle.

Additionally or alternatively, batteries can be mounted to a spanning structure (e.g., between electric vehicles) and/or electrically connected through the payload platform. As an example, a spanning structure can include one or more additional battery packs to extend the range of an electric vehicle and/or an electric vehicle pair.

The battery can cooperatively define an energy storage capacity of: less than 50 kWh, 50 kWh, 70 kWh, 90 kWh, 100 kWh, 110 kWh, 120 kWh, 140 kWh, 150 kWh, 180 kWh, 200 kWh, 220 kWh, 250 kWh, 280 kWh, 300 kWh, 500 kWh, greater than 500 kWh, any open or closed range bounded by the aforementioned values, and/or any other suitable storage capacity. Accordingly, the electric range of the vehicle (e.g., with a nominal payload, unladen, etc.) can be: 100 km, 200 km, 300 km, 400 km, 500 km, 600 km, 700 km, 800 km, 900 km, 1000 km, 1200 km, 1500 km, greater than 1500 km, and/or any other suitable range. Accordingly, the battery capacity may be sized to facilitate efficient container transit (e.g., within a railway platoon) over intermediate haul ranges (e.g., whereas trucking may be optimized for short haul and/or last-mile transit; whereas long locomotive trains may be optimized for long haul transit).

However, the electric vehicle can include any other suitable battery(ies). Alternatively, the electric rail vehicles can otherwise exclude batteries in one or more configurations, such as where a spanning structure battery is electrically decoupled from the vehicle, or the electric vehicle can interface with an electrified rail infrastructure (e.g., third rail) and/or any other suitable power source(s).

The electric powertrain 180 can include: an electric motor and a set of axle assemblies (e.g., wheelsets). The electric powertrain can optionally include a differential (e.g., a lockable differential in either a locked or unlocked configuration, etc.) and can include or be used with a set of mechanical brakes. The electric powertrain functions to generate electromotive force at the motor(s) and to convert this force into vehicle motion (e.g., wheel rotation).

The axle assemblies function to mechanically couple the electric vehicle to a pair of rails via a corresponding pair of rail wheels (e.g., mounted to the axle at either end). The vehicle preferably includes two pairs of rail wheels respectively connected to a front and a rear axle. However, the wheelset can additionally or alternatively include additional wheel pairs and/or additional axles (e.g., 3 pairs, 4 pairs, etc.; 3 axles, 4 axles, etc.) and/or any other suitable set of wheels (e.g., wheelsets). In examples, the vehicle is self-stabilized (e.g., include at least 3 wheels, include a gyroscopic balancing mechanism), which allows the bogies to travel independently through the rail network. Wheels can be rigidly mounted to the axle (e.g., solid axle) and/or rotatably mounted to the axle (e.g., floating axle, hub-motor drive, etc.).

The wheels can be rigid (e.g., solid metal), resilient (e.g., formed with a compliant peripheral layer, such as rubber; a steel tire mounted to a steel hub by a polymeric or otherwise compliant interface; etc.), pneumatic, airless, or of other suitable construction. The wheels are preferably conically tapered (e.g., a taper of about 1 in 20), but can alternatively be un-tapered and/or of other suitable construction. In variants, resilient wheels can be beneficial for shock reduction, since the chassis-mounted components (e.g., controller, battery, vehicle sensors, vibration-sensitive electronics, etc.) may be 'sprung' between the chassis suspension and the payload suspension and are thus more susceptible to wheelset vibration (compared with the payload interface and/or payload). However, the vehicle can include any other suitable wheels.

Figure 20A:
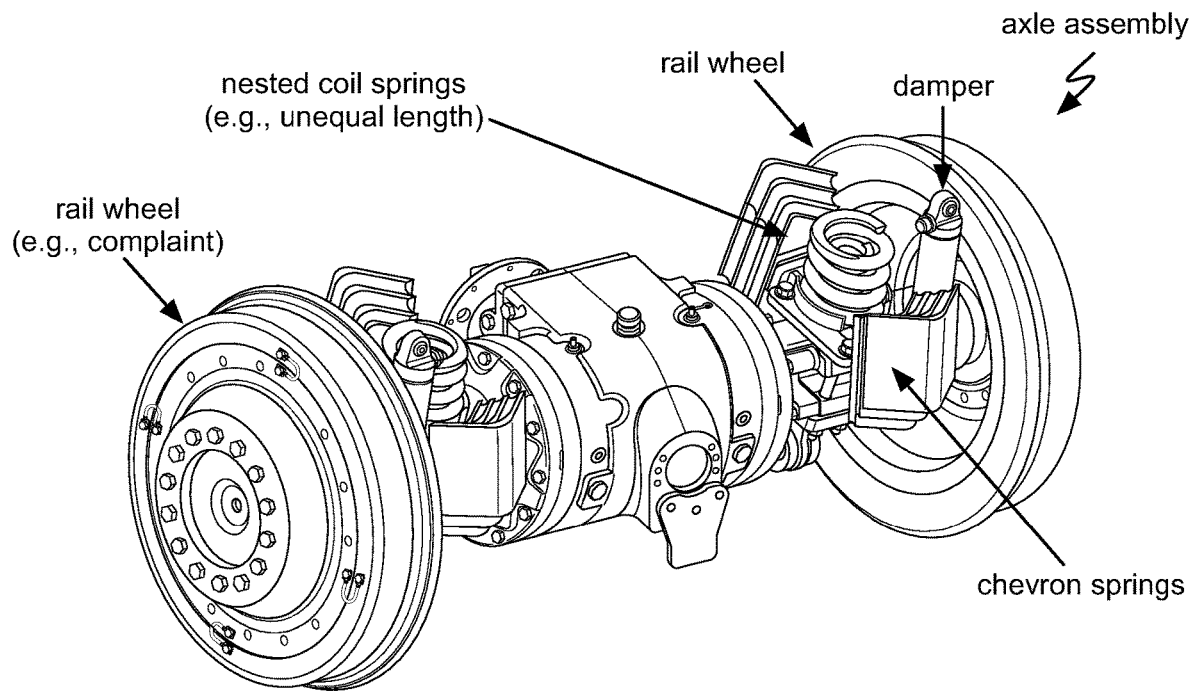
FIGS. 20A-B are isometric views of an example of an axle assembly in a variant of the system.
Figure 20B:
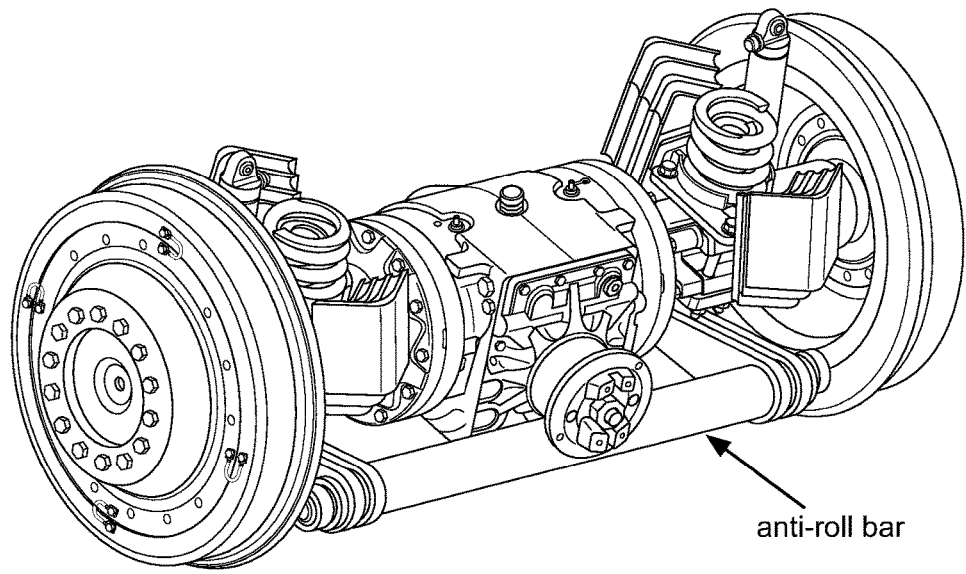

Axles can be: solid axles (e.g., spanning between the wheels and rigidly connecting the wheels, rigid), floating axles, and/or split axles (e.g., examples are shown in FIG. 19, FIG. 20A and FIG. 20B); configured as an automotive rear axle, railcar axle, tractor (e.g., Class 8 vehicle) axle (e.g., floating axle, driving middle axle, etc.); and/or can include any other suitable axle. Axles can be mounted to the chassis suspension inboard of the wheels or outboard of the wheels and, likewise, can include a wheel/hub bearings inboard and/or outboard of the wheel(s). Axles can be configured to rotate with the wheels (e.g., transmitting forces and/or moments between the wheels, transmitting forces and/or moments between powertrain components and one or more wheels) and/or can be static. Different axles of the same vehicle can be of the same or different type (e.g., include a truck axle in the front and a solid axle in the rear). However, the vehicle can include any other suitable axles.

The electric powertrain can include a single motor or multiple motors: per wheel, per axle, per chassis, and/or with any other suitable number of motors. The motor(s) can include: an AC motor, DC motor (e.g., BLDC), inrunner motor, outrunner motor, synchronous motor, asynchronous motor, brushed motor, brushless motor, and/or any other suitable type of motor. However, the electric vehicle can include any other suitable motor(s) with any suitable torque/speed characteristics.

The motor(s) can be connected to the axles and/or wheels of the wheelset in any suitable power-transmitting scheme.

The motor can drive wheel rotation by way of any suitable mechanical drive linkages—such as a chain-drive or gearbox mechanism—providing a static and/or selectively variable gear reduction between the rotation of the motor and the rotation of the wheels. In a first variant, the motor can be connected to a fixed axle (e.g., rigidly connecting a pair of wheels). The motor can be connected to the axle by a chain-drive, gearbox mechanism, lockable differential, and/or other mechanism, and/or can be otherwise mechanically integrated into the axle (e.g., magnetic coils coaxial about the axle).

In a second variant, the motor can be coupled to a wheel which is rotatably mounted about an axle (e.g., at the end of a floating axle). In a first example, a motor can be indirectly connected to a pair of wheels of a floating axle by way of a differential (e.g., which can be selectively locked to prevent relative rotation of the wheels, which can allow relative rotation of the wheels, etc.). In a second example, a set of motors (e.g., 'dual motors') can each be connected to a pair of wheels by a lockable differential. In a third example, a pair of motors can each be directly connected to a respective wheel of a pair of substantially co-axial wheels (e.g., cooperatively defining a 'split', floating axle). In a fourth example, the motor can be integrated into the hub of a wheel (e.g., as a hub motor).

In a third variant, one or more wheels and/or axles of the electric vehicle can be un-powered, non-driven, and/or indirectly driven by a translation of the vehicle (e.g., via to a 'driving' axle of the vehicle). In a first example, a front axle can be connected to and/or powered by a set of motors, while a rear axle is decoupled from the set of motors.

However, the motor can be implemented in conjunction with any suitable drivetrain.

The electric powertrain can additionally include or be used with a set of mechanical brakes which functions to frictionally dissipate the kinetic energy of the vehicle. The mechanical brakes are preferably electrically controlled (e.g., by an electronic braking system or 'EBS'; by the vehicle controller; in a drive-by-wire configuration; etc.), and can be operated by a pneumatic, hydraulic, and/or electromechanical actuation. The mechanical brakes preferably include disc brakes and/or brake calipers, but can additionally or alternatively include a set of friction plates (e.g., engaging similar to a clutch, pairwise, etc.), a drum brake, clasp brake, band brake, and/or any other suitable type of frictional brake. The mechanical brakes can be mounted to each wheel, a wheel pair (e.g., front pair, back pair, etc.), and/or any other suitable set of wheels. The system is preferably capable of controlling the mechanical braking force across a high dynamic range (e.g., can selectively apply 10%, 20%, 40%, 60%, 70%, 80%, 100%, and/or any other suitable proportion of braking force therebetween; high dynamic range relating to latency, rise time, and/or decay time of brake pressure), but can have other braking force control. In variants, the vehicle can include Anti-Lock Brake Systems (ABS) which can be implemented to minimize braking distances.

In variants, the motor and/or electric powertrain can be configured to provide regenerative braking. In such variants, mechanical brakes can serve as an 'auxiliary' braking system to supplement the regenerative braking capacity of the motors and/or 'emergency' brake in the event of motor and/or power failure. In such cases, frequent/primary use of regenerative braking can minimize frictional wear on the mechanical brakes, and/or decrease the frequency of brake servicing. In a specific example, the brakes of the electric rail vehicle can include: a set of hydraulic brakes for each set of rail wheels; and a set of electromechanically actuatable parking brakes for each split axle (e.g., one or more sets of disc brakes coupled to a motor input or driveshaft); wherein the electric powertrain is configured to dynamically harvest energy from at least one axle by regenerative braking.

In variants, the electric powertrain can be configured with any suitable electrical grounding and/or electrical isolation components configured to route electrical current around bearings (e.g., wheel bearings) and/or geartrains, which can include grounding bearing caps, grounding bushes, and/or any other suitable components. The system can optionally include mechanical isolation components (e.g., dampers, electronics suspension elements, etc.) to minimize vibration and force transmission to the electronic components.

However, the electric vehicle can include any other suitable powertrain.

The chassis suspension 170 functions to dampen force (shock) transmission between the wheelset and the chassis 130. Additionally or alternatively, the payload suspension can function to dampen lateral oscillation of the vehicle and/or payload (e.g., commonly known as 'truck hunting'). The chassis suspension can include spring and/or damping elements which can include: 'chevron' springs, coil springs, anti-roll bars, dampers (e.g., hydraulic, pneumatic, etc.) and/or any other suitable components. The chassis suspension can be arranged in a manner resembling an automotive rear suspension (e.g., split suspension; an anti-roll bar coupling both sides of an axle), railcar suspension, tractor (e.g., Class 8 vehicle) axle suspension (e.g., floating axle, driving middle axle, etc.), and/or can be otherwise suitably configured. In a specific example, the chassis suspension can include an anti-roll bar at each axle.

Figure 13:
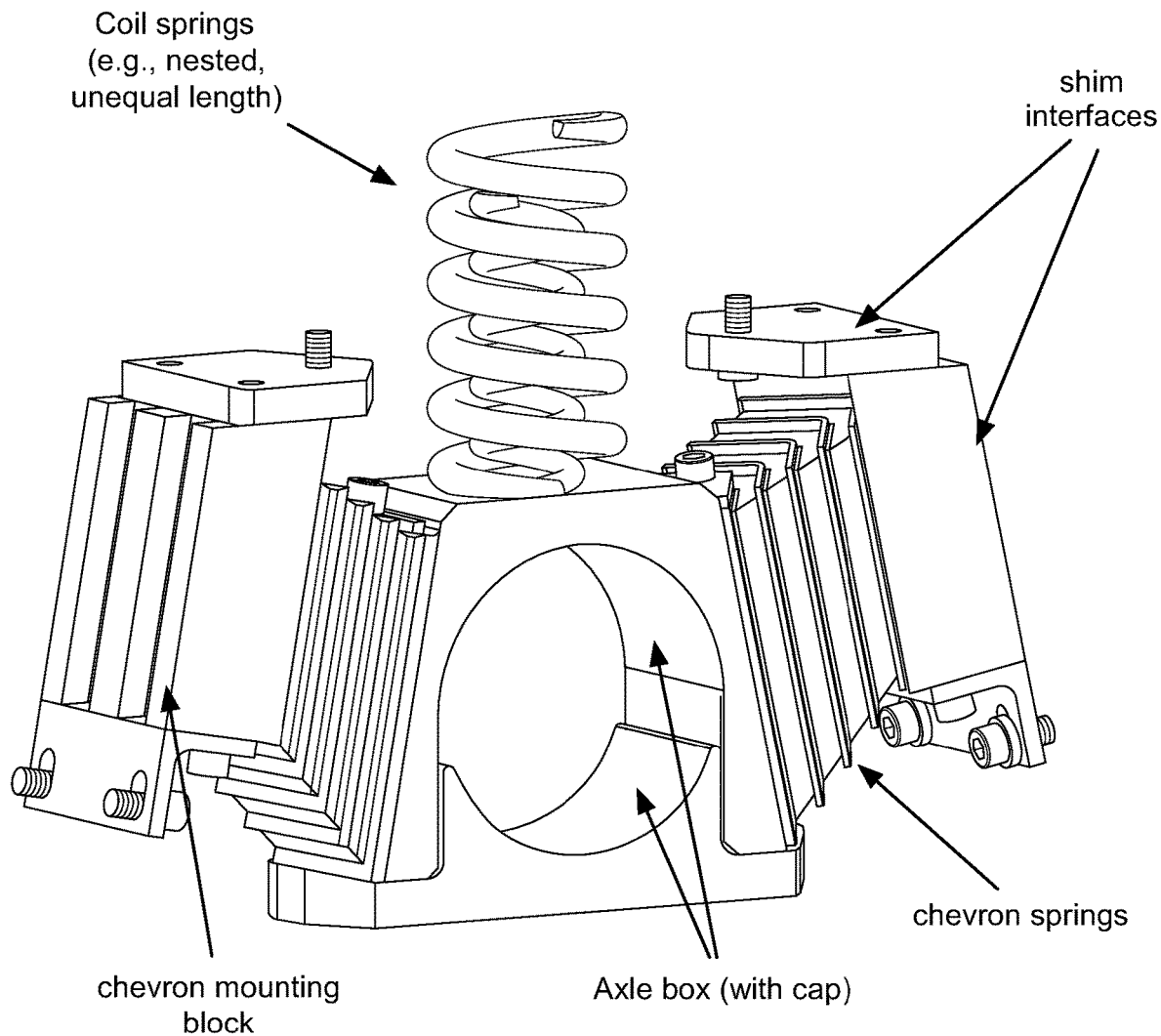
FIG. 13 is a 3D isometric view of an example of a chassis suspension element in a variant of the electric vehicle system.

The chassis suspension can connect to axles outboard of the wheels (an example is shown in FIG. 9), but can alternatively connect to axles inboard of the wheels. The chassis suspension preferably includes vertically-aligned spring elements (e.g., coil springs, chevron springs, etc.), however can additionally or alternatively include spring elements skewed relative to vertical. In a first variant, the chassis suspension can include a combined coil spring and chevron spring assembly, where the chevron springs can provide axle guidance, damping, and a majority (e.g., greater than 60%) of the load carrying capacity. In variants including chevron springs, shim interfaces at the chevrons (an example is shown in FIG. 13; and/or any other suspension elements) can provide ride height and/or axle alignment adjustability. In variants, coil springs can augment vertical stiffness without significantly increasing lateral (e.g., lengthwise and/or spanwise) stiffness. In a first example, multiple nested coil springs (e.g., equal length, unequal length) can be connected to the chassis. In a second example, the chassis suspension can include non-linear springs. In a third example, the springs can be configured to provide stable dynamics and adequate wheel load equalization in an unloaded (~20 k lbs per vehicle), loaded (~100 k lbs per car), and/or double stacked (~170 k lbs per car) configuration.

In a specific example, the chassis suspension can include one suspension element and/or chassis node associated with each wheel of the vehicle (e.g., arranged proximal to the wheel, adjacent to each corner of the vehicle). Alternatively, the chassis suspension can include multiple suspension elements and/or chassis nodes associated with each wheel—such as a chevron spring chassis interface and a coil spring chassis interface. However, the chassis suspension can be otherwise suitably configured.

In variants, the chassis suspension can include chevron springs which can provide axle guidance and a portion of the vehicle's vertical suspension stiffness/damping. Chevron spring parameters are preferably selected as a compromise between steering performance, high-speed stability, vertical natural frequency, and roll stiffness (e.g., in both the maximally laden to unladen weight ratio of the vehicle; while maintaining acceptable dynamics when traveling as a single drone). A relatively low stiffness compared to a conventionally-sized arrangement can reduce the axle angle of attack which minimizes noise, friction, and wheel wear during curving. Per installed pair, the chevron springs can be sized to provide a vertical stiffness which is: less than 2500 lbf/in, 2500 lbf/in, 3500 lbf/in, 5000 lbf/in, 6000 lbf/in, 7000 lbf/in, 7500 lbf/in, lbf 7750 lbf/in, 8000 lbf/in, 8500 lbf/in, 10000 lbf/in, 12000 lbf/in, 15000 lbf/in, greater than 15000 lbf/in, any range bounded by the aforementioned values, and/or any other suitable vertical stiffness. Per installed pair, the chevron springs can be sized to provide a lateral stiffness which is: less than 10000 lbf/in, 10000 lbf/in, 12500 lbf/in, 15000 lbf/in, 16000 lbf/in, 17000 lbf/in, 17500 lbf/in, 18000 lbf/in, 18500 lbf/in, 18750 lbf/in, 19000 lbf/in, 19500 lbf/in, 20000 lbf/in, 22500 lbf/in, 25000 lbf/in, 30000 lbf/in, greater than 30000 lbf/in, any range bounded by the aforementioned values, and/or any other suitable lateral stiffness. Per installed pair, the chevron springs can be sized to provide a longitudinal stiffness which is: less than 35000 lbf/in, 35000 lbf/in, 50000 lbf/in, 55000 lbf/in, 60000 lbf/in, 62500 lbf/in, 64000 lbf/in, 65000 lbf/in, 67500 lbf/in, 70000 lbf/in, 75000 lbf/in, 80000 lbf/in, 100000 lbf/in, greater than 100000 lbf/in, any range bounded by the aforementioned values, and/or any other suitable longitudinal stiffness.

In variants, the coil springs coil springs can be arranged with a nested, unequal-length pair at each corner of the vehicle. This can advantageously vary the vehicle's effective vertical spring stiffness as a function of total vehicle payload (e.g., to maintain the ride natural frequency in a range of 2-5 Hz). In an example, chevron springs can bear the entire weight of the drone chassis and payload until payload reaches a first threshold (e.g., 40 klbm), at which point the first of the two coil springs will begin to participate and contribute stiffness. Once the payload exceeds a second threshold (e.g., 120 klbm), the (nested) second coil spring will also be in contact and add its stiffness to the suspension motion (e.g., adds 25%, 35%, 45%, etc. more lateral axle stiffness and/or shear stiffness to the overall system). As the coil springs make contact with the axle assembly, they can also contribute stiffness in the lateral and longitudinal directions (to a lesser extent than vertical stiffness). The first of the coil springs can have a lower shear stiffness than the second coil spring; however, the coil springs can be otherwise related.

In variants, the chevron springs may provide some damping to prevent oscillation and resonance of the various vehicle modes, however, the additional stiffness contributed by the coil and torsion springs may leave the vehicle underdamped without an additional source of damping. As an example, four heavy-duty automotive-style gas-hydraulic dampers may provide additional damping force (e.g., 100 lbf*s/in) to maintain damping ratios within a desirable range (e.g., in all loading scenarios).

However, the electric vehicle can include any other suitable chassis suspension.

The optional cooling subsystem 184 can function to reject heat from the electric motor, motor controller, and/or batteries. In a first variant, the cooling system can include a super-ambient cooling loop, which includes a liquid working fluid (e.g., oil, water/glycol) which is circulated through a radiator (or set of radiators, such as a pair of radiators respectively mounted at the front and rear) or other liquid-air type heat exchanger. In a second variant, the cooling system can include a sub-ambient loop which is thermally connected to the battery, wherein the working fluid of the sub-ambient loop is configured to remain below ambient temperature (e.g., by way of a refrigeration cycle and/or a separate refrigerant loop). Alternatively, the battery can be thermally decoupled from the cooling subsystem and/or rely on passive conduction and/or air convection to dissipate battery heat. In particular, thermally decoupled battery configurations can be particularly desirable when employed in conjunction with battery chemistries with low energy density, where the ratio of specific heat capacity of the battery to charge density is much larger (e.g., when compared to energy dense chemistries) and, as such, the corresponding cooling requirements are lessened.

However, the electric vehicle can include any other suitable cooling subsystem.

The sensor suite 150 functions to monitor vehicle state parameters which can be used for vehicle control (e.g., autonomous vehicle control). The sensor suite can include: internal sensors (e.g., force sensors, accelerometers, gyroscopes, IMU, INS, temperature, voltage/current sensors, etc.), external antennas (e.g., GPS, cellular, Bluetooth, Wi-Fi, Near Field Communication, etc.), rail sensors (e.g., wheel encoders, cameras, temperature sensors, voltage/current sensors, accelerometers, etc.), payload sensors (e.g., force sensors/switches, cameras, lights, accelerometers, NFC sensors, etc.), environmental sensors (e.g., cameras, temperature, wind speed/direction, accelerometers), guidance sensors (e.g., load cells, bumper contact switches, strain sensors, lights, horn, sonar, lidar, radar, cameras, etc.; an example is shown in FIG. 28C), and/or any other suitable sensors. The sensors can include one or more: Radar sensors, LIDAR sensors, sonar sensors, cameras, spatial sensors, location sensors, force sensors, on-board diagnostic sensors such as vehicle mechanism sensors, audio sensors, barometers, light sensors, temperature sensors, current sensors, air flow meters, voltmeters, contact sensors, proximity sensors, vibration sensors, ultrasound sensors, electrical sensors, and/or any other suitable sensors. However, the electric vehicle can include any other suitable sensors.

Figure 24:
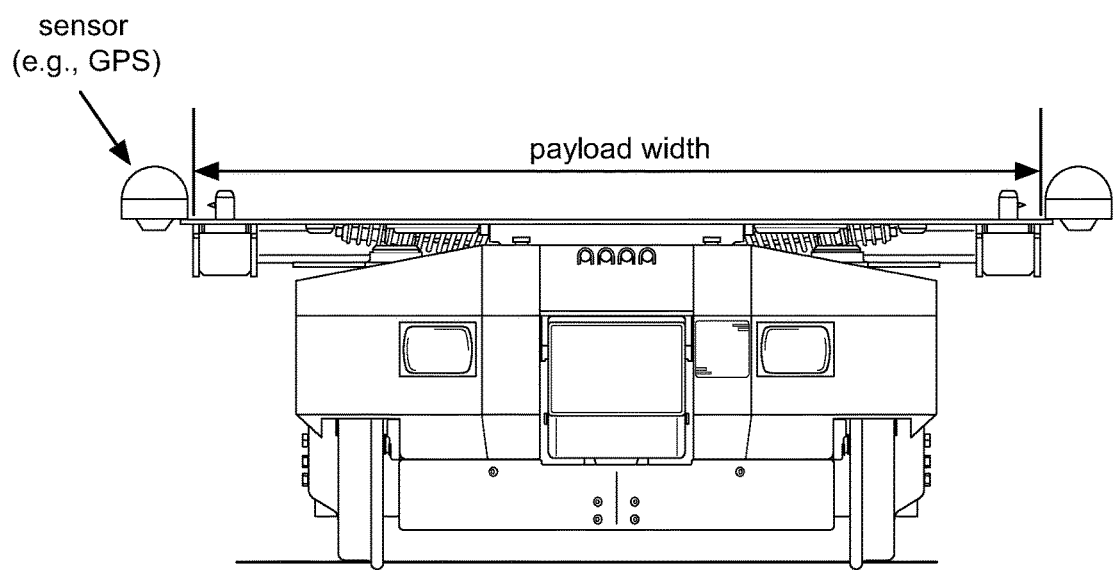
FIG. 24 is a front view representation of a variant of the electric vehicle system.

In variants, one or more sensors of the sensor suite can be oriented towards the payload and arranged at a periphery of the vehicle (e.g., corners, sides, front, rear, etc.), such as to enable wireless connectivity. In such cases, the payload interface can include notches or cut-out peripheral sections of payload interface to avoid sensor interference and/or obstruction of sensor measurement/operation (an example is shown in FIG. 8; a second set of examples are shown in FIGS. 23 and 24).

In variants, the sensor suite can include a bumper feedback sensor 152 which is configured to measure an axial compressive force along the compression axis. The bumper feedback sensor is preferably integrated into the physical structure of the bumper and/or bumper suspension (e.g., and configured to directly measure compressive force; such as a strain gage or load cell), but can alternatively be adjacent to the bumper and measure axial compression of the bumper indirectly (e.g., based on distance/proximity, optically, etc.). In such variants, the bumper feedback sensor may be used to provide loop closure for autonomous (force) control to maintain compressive contact between adjacent vehicles within a rail network. However, the sensor suite can include any other suitable bumper feedback sensor; and the vehicle can be otherwise autonomously controlled based on the bumper feedback sensor and/or without feedback from the bumper feedback sensor (e.g., in one or more operating modes, such as when an electric rail vehicle is traversing independently along rail).

Figure 27:
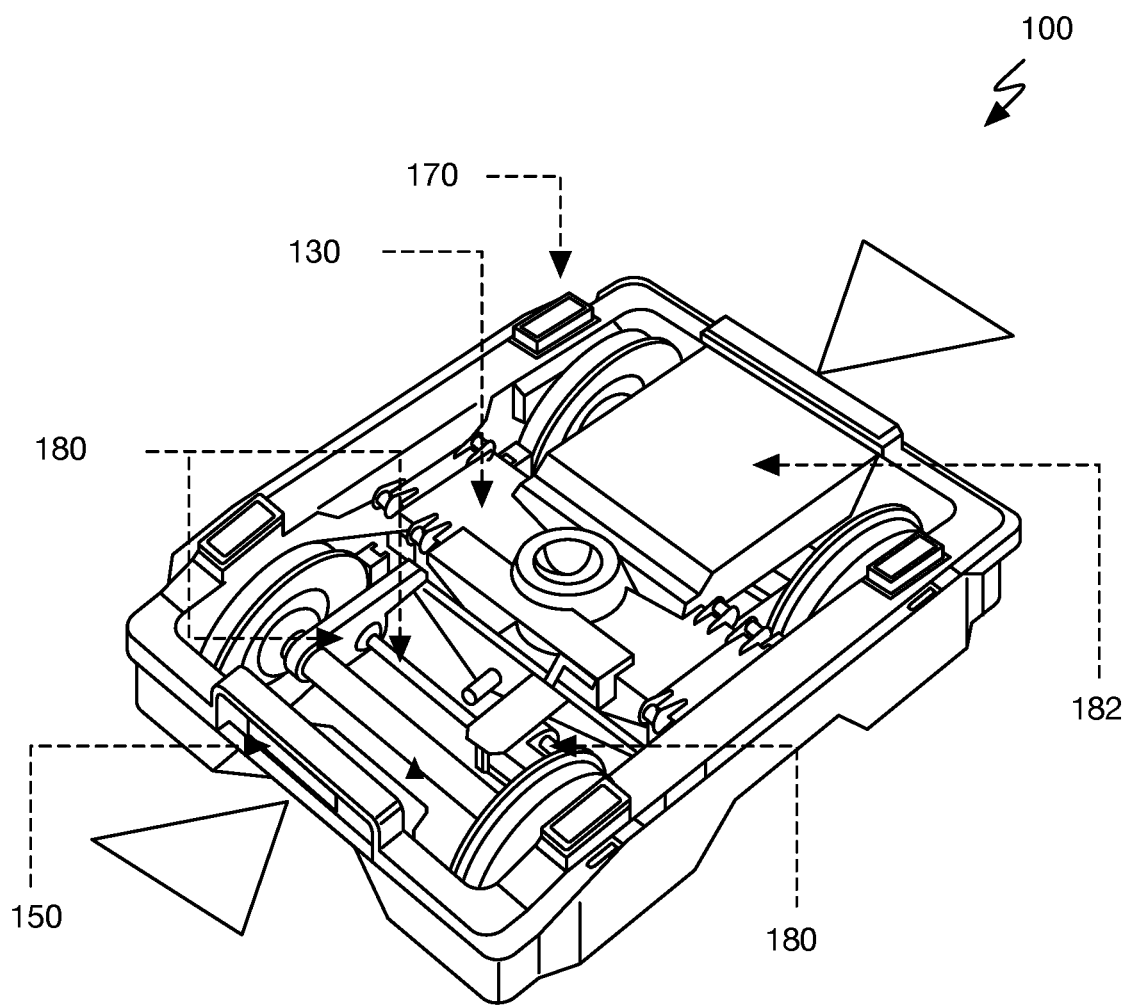
FIG. 27 is a 3D view illustrating an example of the electric vehicle system.

In variants, the sensors of the vehicle are preferably symmetric about a frontal-midplane (e.g., front set of sensors symmetric with a rear set of sensors; an example is shown in FIG. 27), which may facilitate transportation in either direction along a rail and/or any arrangement of the electric vehicle beneath a payload (e.g., at either end). Additionally or alternatively, this may facilitate simplified relative positioning of the electric vehicles during container mounting (e.g., when not connected by a spanning structure). In variants, one or both electric rail vehicles of a pair (e.g., an example is shown in FIG. 10) can include a camera and a range sensor (e.g., Lidar, RADAR, time-of-flight ranging sensor, etc.) oriented towards a second vehicle of the pair. In variants, each electric rail vehicle of the pair further comprises a second bumper opposite the outboard bumper along the longitudinal axis.

However, the electric vehicle can include any other suitable sensor suite.

The controller 160 can include a battery management system (BMS), motor controller (or motor inverter), brake controller, and/or any other suitable components. The controller functions to distribute power within the system to affect vehicle control. The controller can additionally or alternatively function to implement autonomous navigation commands, teleoperation commands (e.g., received from a remote teleoperator), autonomous vehicle control, and/or any other vehicle control. The controller is preferably onboard the vehicle (e.g., mounted to the chassis, etc.), but can alternatively be remote from the vehicle. The controller can be centralized (e.g., packaged within a single module) or distributed (e.g., across multiple compute nodes, packaged within multiple compute modules, etc.). The controller can receive sensory inputs/measurements from the sensor suite, which can be used to determine a vehicle state, dynamically control the vehicle, manage the batteries, and/or control the electric powertrain.

The controller can include a battery management system which functions to monitor the state of the battery. The state of the battery can include: state of charge (SoC), state of health (SoH), state of power (SoP), state of safety (SoS), temperature (e.g., of the battery or a set of cells therein, of a working fluid, a temperature distribution of battery cells, etc.), and/or any other suitable characteristics. The battery management system can also function to control the charge and/or discharge of the battery. However, the controller can include any other suitable BMS.

The controller can include one or more motor controllers which function to condition power from the battery to be supplied to a motor and/or to control electrical propulsion and/or dynamic (regenerative) braking at the motor. There can be a single motor controller associated with the vehicle, one motor controller per motor, and/or any other suitable number of motor controllers. However, the controller can include any other suitable motor controllers.

In variants, the controller can function to facilitate vehicle transit and/or powertrain control as described in U.S. application Ser. No. 17/335,732, filed 1 Jun. 2021, which is incorporated herein in its entirety by this reference.

In variants, the controller can control the electric vehicle(s) individually or may be used to control vehicles in a pairwise manner (e.g., via V2V communications, etc.). For example, a controller of a leading electric vehicle can be used to control an adjacent, trailing electric vehicle (e.g., cooperatively mounting/supporting a payload with the leading electric vehicle), or both the leading and trailing vehicles can be independently (autonomously) controlled by a respective controller.

However, the electric vehicle can include any other suitable controller.

However, the electric vehicle can include any other suitable components.

Figure 14A:
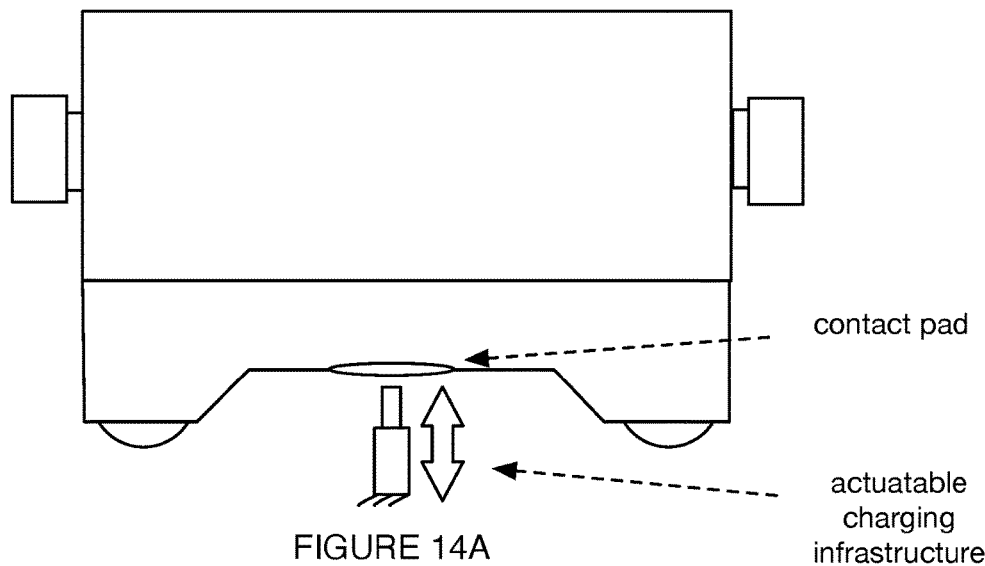
FIGS. 14A-C are diagrammatic representations of variants of an interface between the electric vehicle and charging infrastructure.
Figure 14B:
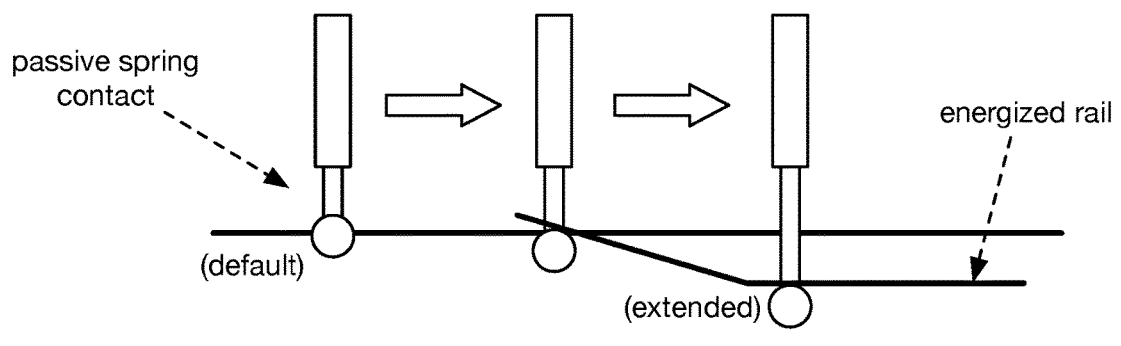
Figure 14C:
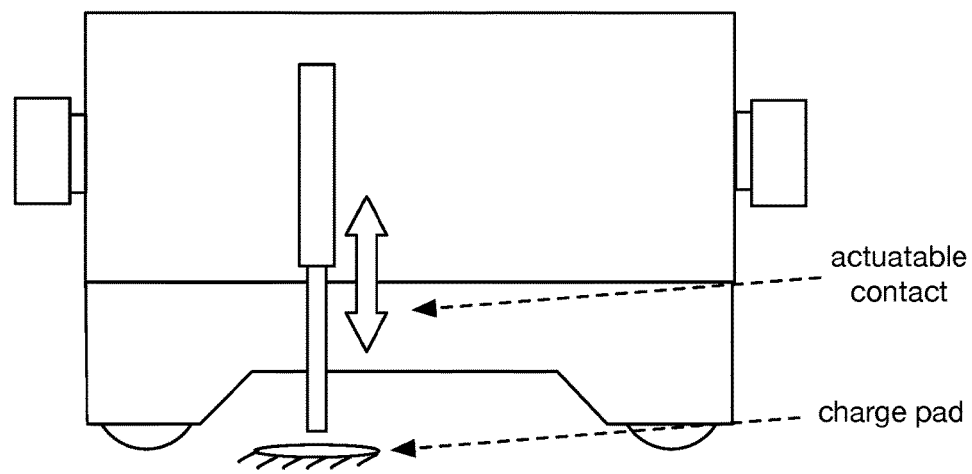
Figure 15:
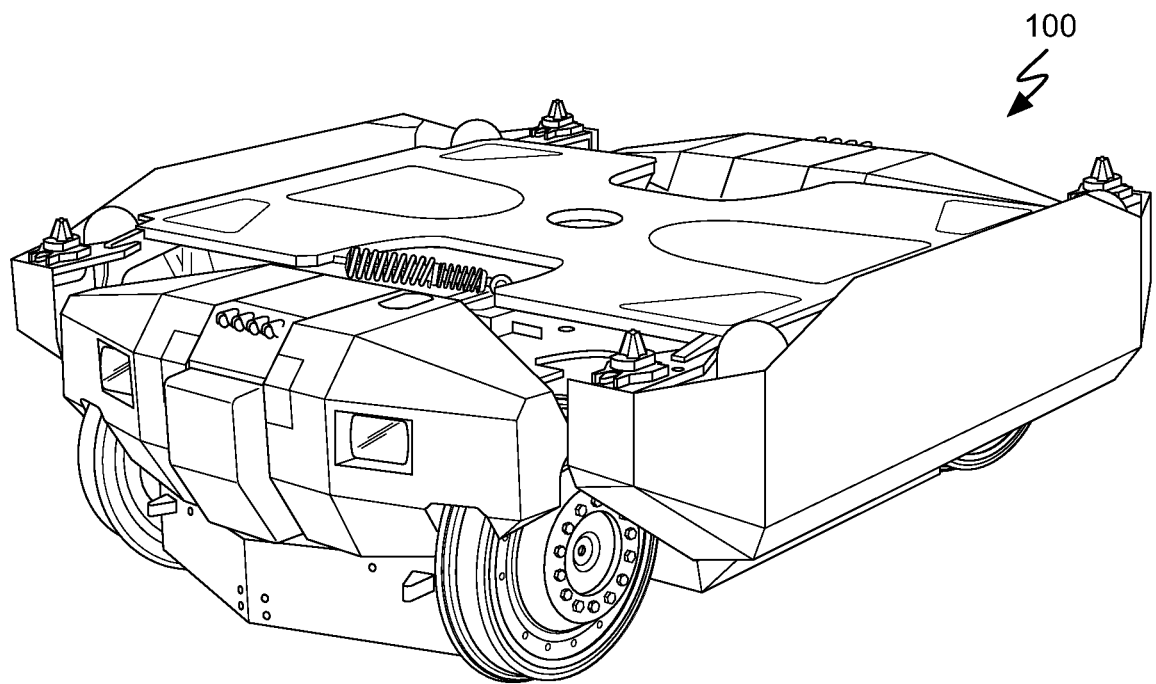
FIG. 15 is an isometric view of a variant of an electric vehicle system.
Figure 16:
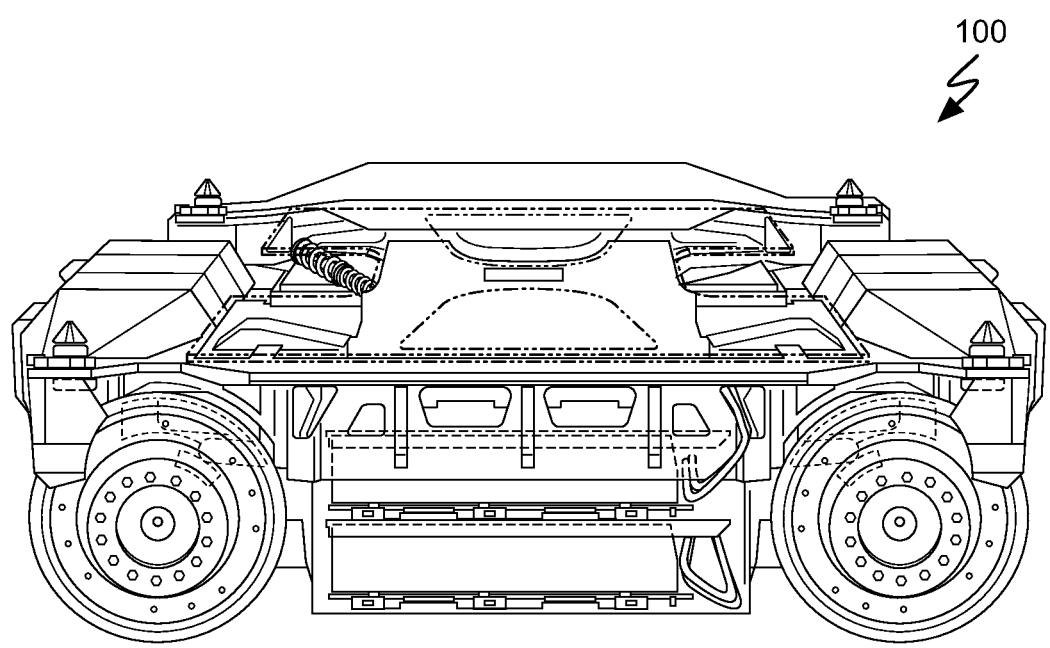
FIG. 16 is 3D representation of a variant of the electric vehicle, with partial transparency.
Figure 17:
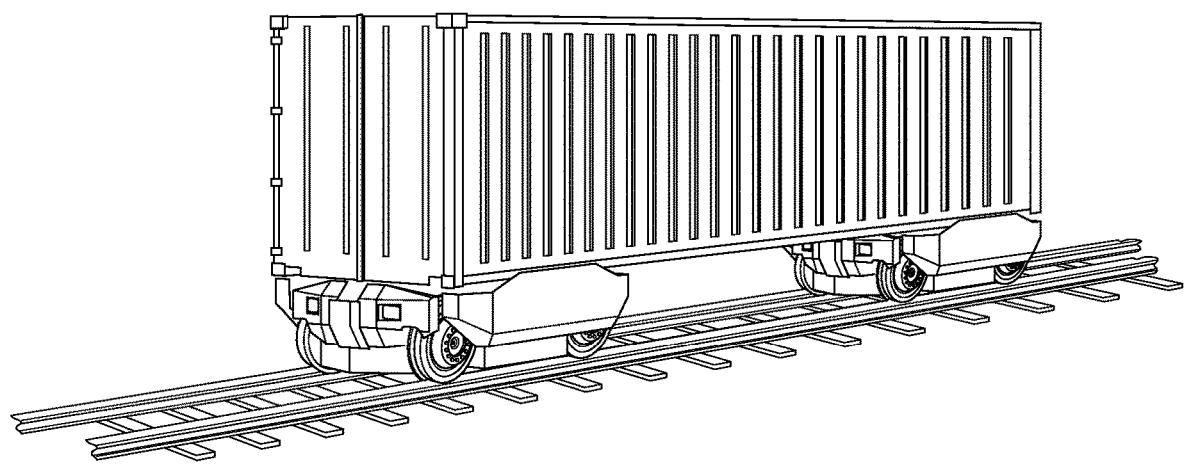
FIG. 17 is an isometric view of a variant of an electric vehicle system.

The electric vehicle can be configured to interface with a charging infrastructure, which functions to supply electrical energy to the battery pack (e.g., to be stored as electrochemical energy). In a first variant, the electric vehicle can engage and/or receive a sliding and/or actuatable contact of a track/rail infrastructure (an example is shown in FIG. 14A). In a second variant, the electric vehicle can include a passive spring-loaded contact (e.g., extending below a threshold height, between the rails, etc.) configured to engage a third rail of a charging infrastructure (an example is shown in FIG. 14B). In a third example, the vehicle can include an actuatable spring contact configured to engage a charging pad/plate (e.g., between rails; while stationary; an example is shown in FIG. 14C).

However, the electric vehicle can be otherwise configured to receive/store energy from an extravehicular installation and/or electric charging infrastructure.

In variants, relative position descriptions used herein, such as "front," "back," "left," and "right" are for ease of reference only, and do not constrain the electric vehicle to a single orientation.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. An electric rail vehicle comprising:
   a chassis defining a longitudinal axis and a lateral axis perpendicular to the longitudinal axis, the chassis having a stiffness mismatch between the lateral and longitudinal axes;
   a set of bumpers mounted to the chassis, the set of bumpers comprising an abutment surface at a maximal extent of the electric rail vehicle along the longitudinal axis;
   a payload interface configured to mount a cargo payload to the electric rail vehicle;
   a bolster bowl rotatably mounting the payload interface to the chassis;
   a plurality of suspension elements coupling the payload interface and the chassis which are symmetrically distributed relative to a midsagittal plane of the chassis;
   an electric powertrain mounted to the chassis and comprising: a traction motor and a pair of wheelsets, wherein at least one wheelset of the pair is rotatably coupled to an output of the traction motor, wherein each wheelset comprises: a split axle and a rail wheel at each end of the split axle, wherein the electric rail vehicle further comprises a chassis suspension independently coupling each rail wheel to the chassis;
   a battery electrically coupled to the electric powertrain;
   a set of sensors comprising: a bumper feedback sensor and a GPS sensor; and
   a vehicle controller mechanically coupled to the chassis and configured to autonomously control the electric powertrain based on measurements from the set of sensors.

2. The electric rail vehicle of claim 1, wherein the set of bumpers comprises a pair of bumpers arranged at opposite ends of the electric rail vehicle along the longitudinal axis.

3. The electric rail vehicle of claim 1, wherein each bumper comprises bumper suspension defining a compression axis parallel to the longitudinal axis, wherein the bumper feedback sensor is coupled to the bumper suspension and configured to measure an axial compressive force along the compression axis.

4. The electric rail vehicle of claim 3, wherein the bumper feedback sensor comprises a load cell.

5. The electric rail vehicle of claim 3, wherein the vehicle controller is configured to autonomously control a motor of the electric powertrain based on the axial compressive force along the compression axis.

6. The electric rail vehicle of claim 1, wherein the payload interface comprises payload mounting surface and a pair of side panels extending upward from the payload mounting surface, the pair of side panels on opposing sides of the midsagittal plane and defining a positive draft angle relative to the payload mounting surface, wherein the payload mounting surface is substantially planar and orthogonal to a central axis of the bolster bowl.

7. The electric rail vehicle of claim 6, wherein the GPS sensor is arranged beneath a boundary plane defined by a superior surface of a side panel.

8. The electric rail vehicle of claim 1, wherein the set of sensors further comprises a camera and a set of range imaging sensors, the set of range imaging sensors comprising a LIDAR or a Radar.

9. The electric rail vehicle of claim 1, further comprising:
   a set of hydraulic brakes for each wheelset; and
   a set of electromechanically actuatable parking brakes for each split axle;
   wherein the electric powertrain is configured to dynamically harvest energy from at least one split axle by regenerative braking.

10. The electric rail vehicle of claim 1, wherein the chassis suspension comprises:
    an anti-roll bar, coupled to each end of each split axle; and
    at each end of the split axle: a pair of nested coil springs; a set of chevron springs aligned with an axis of the pair of nested coil springs; and a damper.

11. The electric rail vehicle of claim 1, wherein a torsional stiffness about the lateral axis is at least triple a torsional stiffness about the longitudinal axis.

12. The electric rail vehicle of claim 1, wherein the stiffness mismatch of the chassis comprises: greater torsional compliance along the longitudinal axis and greater spanwise rigidity parallel to the lateral axis.

13. The electric rail vehicle of claim 1, wherein the pair of wheelsets comprises a first split axle and a second split axle, wherein a torsional stiffness of the chassis about the longitudinal axis between the first and second axles is between 500,000 in*lbf/deg and 1,500,000 in*lbf/deg.

14. A rail system for autonomously transporting a cargo container comprising a pair of electric rail vehicles, each electric rail vehicle comprising:
   a payload interface, the cargo container removably mounted to the payload interface;
   a chassis defining a longitudinal axis and a lateral axis perpendicular to the longitudinal axis, wherein the chassis is more torsionally compliant about the longitudinal axis than about the lateral axis;
   a set of bumpers mounted to the chassis, the set of bumpers comprising an outboard bumper comprising an abutment surface at a maximal extent of the vehicle along the longitudinal axis and extending beyond the cargo container along the longitudinal axis;

a bolster bowl rotatably mounting the payload interface to the chassis;

a plurality of suspension elements coupling the payload interface and the chassis which are symmetrically distributed relative to a midsagittal plane of the chassis;

an electric powertrain mounted to the chassis and comprising: a traction motor and a pair of wheelsets, wherein at least one wheelset of the pair is rotatably coupled to an output of the traction motor, wherein each wheelset comprises: a split axle and a rail wheel at each end of the split axle, wherein the electric rail vehicle further comprises a chassis suspension independently coupling each rail wheel to the chassis;

a battery electrically coupled to the electric powertrain; and a bumper feedback sensor coupled to the outboard bumper and configured to measure compressive force at the outboard bumper.

15. The rail system of claim 14, wherein the bumper comprises bumper suspension defining a compression axis parallel to the longitudinal axis, wherein the bumper feedback sensor is coupled to the bumper suspension and configured to measure an axial compressive force along the compression axis, wherein the vehicle controller of a first electric rail vehicle of the pair is configured to autonomously control a motor of the electric powertrain based on the axial compressive force along the compression axis.

16. The rail system of claim 14, wherein each electric rail vehicle further comprises a GPS sensor arranged beneath a base plane of the cargo container.

17. The rail system of claim 14, wherein a first electric rail vehicle of the pair further comprises a camera and a range sensor oriented towards a second vehicle of the pair.

18. The rail system of claim 14, wherein each electric rail vehicle of the pair further comprises a second bumper opposite the outboard bumper along the longitudinal axis.

19. The rail system of claim 14, wherein a longitudinal length of each electric rail vehicle is less than 12 feet.

20. The rail system of claim 14, further comprising a spanning structure mounted to the payload interface of each electric rail vehicle of the pair, wherein the cargo container is removably mounted via the spanning structure.

21. A rail system for autonomously transporting a cargo container comprising a pair of electric rail vehicles, each electric rail vehicle comprising:

a payload interface, the cargo container removably mounted to the payload interface;

a chassis defining a longitudinal axis and a lateral axis perpendicular to the longitudinal axis, wherein the chassis is more torsionally compliant about the longitudinal axis than about the lateral axis;

a set of bumpers mounted to the chassis, the set of bumpers comprising an outboard bumper comprising an abutment surface at a maximal extent of the vehicle along the longitudinal axis and extending beyond the cargo container along the longitudinal axis;

a bolster bowl rotatably mounting the payload interface to the chassis;

a plurality of suspension elements coupling the payload interface and the chassis which are symmetrically distributed relative to a midsagittal plane of the chassis;

an electric powertrain mounted to the chassis and comprising a plurality of rail wheels;

a battery electrically coupled to the electric powertrain; and a bumper feedback sensor coupled to the outboard bumper and configured to measure compressive force at the outboard bumper; and a spanning structure mounted to the payload interface of each electric rail vehicle of the pair, wherein the cargo container is removably mounted via the spanning structure.

* * * * *